US007199363B2

(12) United States Patent
Bateman et al.

(10) Patent No.: US 7,199,363 B2
(45) Date of Patent: Apr. 3, 2007

(54) MASS SPECTROMETER

(75) Inventors: Robert Harold Bateman, Manchester (GB); Jeffery Mark Brown, Cheshire (GB); Daniel James Kenny, Cheshire (GB)

(73) Assignee: Micromass UK Limited (GB)

( * ) Notice: Subject to any disclaimer, the term of this patent is extended or adjusted under 35 U.S.C. 154(b) by 141 days.

(21) Appl. No.: 10/964,791

(22) Filed: Oct. 14, 2004

(65) Prior Publication Data

US 2005/0098721 A1 May 12, 2005

Related U.S. Application Data

(60) Provisional application No. 60/511,357, filed on Oct. 16, 2003, provisional application No. 60/556,313, filed on Mar. 25, 2004.

(51) Int. Cl.
*B01D 59/44* (2006.01)
*H01J 49/00* (2006.01)

(52) U.S. Cl. ...................... 250/287; 250/282; 250/285; 250/288

(58) Field of Classification Search ................ 250/282, 250/285, 287
See application file for complete search history.

(56) References Cited

U.S. PATENT DOCUMENTS 5,202,563 A * 4/1993 Cotter et al. ................ 250/287
5,464,985 A 11/1995 Cornish et al.
5,734,161 A 3/1998 Koster
5,861,623 A * 1/1999 Park ........................... 250/287
5,986,258 A * 11/1999 Park ........................... 250/287
6,107,623 A * 8/2000 Bateman et al. ............ 250/282
6,469,295 B1 * 10/2002 Park ........................... 250/282
2001/0030284 A1 * 10/2001 Dresch et al. .............. 250/287
2002/0125420 A1 * 9/2002 Park ........................... 250/281

(Continued)

OTHER PUBLICATIONS

Improved PSD and CID on a MALDI TOFMS, Hoteling, et al,2004 Journal American Society for Mass Spectrometry 2004, 15, 523-535.

(Continued)

*Primary Examiner*—Nikita Wells
*Assistant Examiner*—Johnnie L Smith, II
(74) *Attorney, Agent, or Firm*—Anthony J. Janick; Jamie H. Rose

(57) ABSTRACT

A mass spectrometer is disclosed comprising an ion source 4, a field free or drift region 5 and an ion mirror 7 comprising a reflectron. Metastable parent ions which spontaneously fragment by Post Source Decay whilst passing through the field free or drift region 5 are arranged to enter the ion mirror 7 and be reflected by the reflectron towards an ion detector 8 when the reflectron is maintained at a certain voltage. The process is then repeated with the reflectron being maintained at a slightly lower voltage. Two related sets of time of flight or mass spectral data are obtained for the two different voltage settings of the reflectron. From the two data sets the different times of flight for the same species of fragment ion can be determined. The mass to charge ratio of the parent ion which fragmented to produce the particular species of fragment ion can then be determined from the times of flight of the fragment ions.

102 Claims, 9 Drawing Sheets

U.S. PATENT DOCUMENTS

| | | | | |
|---|---|---|---|---|
| 2002/0145109 | A1* | 10/2002 | Doroshenko | 250/287 |
| 2004/0113064 | A1* | 6/2004 | Fuhrer et al. | 250/287 |
| 2004/0159782 | A1* | 8/2004 | Park | 250/282 |
| 2005/0035283 | A1* | 2/2005 | Hieftje et al. | 250/285 |
| 2006/0108520 | A1* | 5/2006 | Parl et al. | 250/287 |

OTHER PUBLICATIONS

J. M. L'Hermite, et al; "A New method to study metastable fragmentation of clusters . . . "; American Institute of Physics, vol. 71, No. 5, May 2000.

* cited by examiner

| Observed Parent (Da) | Best Estimate of Fragment (Da) | Actual (Text book) Mass of Fragment (Da) | Mass Error (Da) | Sequence From ADH |
|---|---|---|---|---|
| 2312.2 | | | | ATDGGAHGVINSVSEAAIEASTR |
| | 1839.0 | 1840 | -1.0 | y18 |
| | 1749.5 | 1749.9 | -0.4 | b19 |
| | 1702.1 | 1702.9 | -0.8 | y17 |
| | 1644.8 | 1645.9 | -1.1 | y16 |
| | 1636.0 | 1636.8 | -0.8 | b18 |
| | 1546.1 | 1546.8 | -0.7 | y15 |
| | 1493.9 | 1494.7 | -0.8 | b16 |
| | 1432.6 | 1433.7 | -1.1 | y11 |
| | 1415.8 | no match | | |
| 1618.8 | | | | VLGIDGGEGKEELFR |
| | 1236.2 | 1236.6 | -0.4 | y5 |
| | 1219.2 | no match | | |
| | 1184.1 | 1184.6 | -0.5 | b12 |
| | 1121.1 | 1121.6 | -0.5 | y6 |
| | 1055.2 | 1055.5 | -0.3 | b10 |
| | 1064.1 | 1064.5 | -0.4 | y7 |
| | 878.6 | 878.5 | 0.1 | y9 |
| 968.5 | | | | EALDFFAR |
| | 768.4 | 768.4 | 0.0 | y6 |
| | 723.5 | 723.3 | 0.2 | b6 |
| | 540.3 | 540.3 | 0 | y4 |

FIG. 6

| Nominal Mass (Da) | Individual Ion Score | Ranking | Sequence |
|---|---|---|---|
| 968 | 20 | 1 | EALDFFAR |
| 1136 | 15 | 1 | GVIFYESHGK |
| 1618 | 43 | 1 | VLGIDGGEGKEELFR |
| 2019 | 12 | 1 | LPLVGGHEGAGVVVGMGENVK |
| 2312 | 99 | 1 | ATDGGAHGVINVSVSEAAIEASTR |

| # | Immon | a | a* | $a^0$ | b | b* | $b^0$ | Amino Acid Seq. | y | # |
|---|---|---|---|---|---|---|---|---|---|---|
| 1 | 44.05 | 44.05 | | | 72.04 | | | A | | 24 |
| 2 | 74.06 | 145.10 | | 127.09 | 173.09 | | 155.08 | T | 2241.11 | 23 |
| 3 | 88.04 | 260.12 | | 242.11 | 288.12 | | 270.11 | D | 2140.06 | 22 |
| 4 | 30.03 | 317.15 | | 299.13 | 345.14 | | 327.13 | G | 2025.04 | 21 |
| 5 | 30.03 | 374.17 | | 356.16 | 402.16 | | 384.15 | G | **1968.01** | 20 |
| 6 | 44.05 | 445.20 | | 427.19 | **473.20** | | **455.19** | A | **1910.99** | 19 |
| 7 | 110.07 | **582.26** | | 546.25 | **610.26** | | 592.25 | H | **1839.96** | 18 |
| 8 | 30.03 | 639.28 | | **621.27** | **667.28** | | **649.27** | G | **1702.9** | 17 |
| 9 | 72.08 | **738.35** | | 720.34 | **766.35** | | 748.34 | V | **1645.88** | 16 |
| 10 | 86.10 | **851.44** | | 833.43 | **879.43** | | 861.42 | I | **1546.81** | 15 |
| 11 | 87.06 | 965.48 | 948.45 | **947.47** | **993.47** | 976.45 | **975.46** | N | **1433.72** | 14 |
| 12 | 72.08 | 1064.55 | 1047.52 | 1046.54 | **1092.54** | 1075.52 | 1074.53 | V | **1319.68** | 13 |
| 13 | **60.04** | 1151.58 | **1134.55** | **1133.57** | **1179.58** | 1162.55 | 1161.56 | S | **1220.61** | 12 |
| 14 | 72.08 | 1250.65 | 1233.62 | 1232.64 | 1278.64 | 1261.62 | 1260.63 | V | **1133.58** | 11 |
| 15 | **60.04** | 1337.68 | 1320.65 | **1319.67** | 1365.68 | 1348.65 | 1347.67 | S | **1034.51** | 10 |
| 16 | 102.05 | 1466.72 | 1449.7 | 1448.71 | 1494.72 | 1477.69 | 1476.71 | E | **947.48** | 9 |
| 17 | 44.05 | 1537.76 | 1520.73 | 1519.75 | **1565.76** | 1548.73 | 1547.74 | A | **818.44** | 8 |
| 18 | 44.05 | 1608.80 | 1591.77 | 1590.79 | **1636.79** | 1619.77 | 1618.78 | A | **747.4** | 7 |
| 19 | 86.10 | 1721.88 | 1704.86 | 1703.87 | 1749.88 | 1732.85 | 1731.87 | I | **676.36** | 6 |
| 20 | 102.05 | 1850.92 | 1833.9 | 1832.91 | **1878.92** | 1861.89 | 1860.91 | E | 563.28 | 5 |
| 21 | 44.05 | 1921.96 | 1904.93 | 1903.95 | 1949.96 | 1932.93 | 1931.95 | A | **434.24** | 4 |
| 22 | **60.04** | 2008.99 | 1991.97 | 1990.98 | 2036.99 | 2019.96 | 2018.98 | S | 363.2 | 3 |
| 23 | 74.06 | 2110.04 | 2093.01 | 2092.03 | 2138.04 | 2121.01 | 2120.03 | T | 276.17 | 2 |
| 24 | 129.11 | | | | | | | R | 175.12 | 1 |

FIG. 10

MASS SPECTROMETER

CROSS REFERENCE TO RELATED APPLICATIONS

This application claims priority from United Kingdom patent application GB-0324054.6 filed Oct. 14, 2003, U.S. Provisional Application No.60/511,357 filed Oct. 16, 2003, United Kingdom patent application GB-0404186.9 filed Feb. 25, 2004, U.S. Provisional Application 60/556,313 filed Mar. 25, 2004 and United Kingdom patent application GB-0406601.5 filed Mar. 24, 2004. The contents of these applications are incorporated herein by reference.

FIELD OF THE INVENTION

The present invention relates to a mass spectrometer and a method of mass spectrometry.

BACKGROUND OF THE INVENTION

Matrix Assisted Laser Desorption Ionisation ("MALDI") is a method of generating ions of analyte substances. It is a particularly successful technique for the generation of ions of large organic and biochemical molecules for which many other ionisation techniques are largely unsuccessful. The analyte material is dissolved in an appropriate solvent. A droplet of the solution and a droplet of another solution of an appropriate matrix material are then placed on the surface of a sample or target plate such that the two solutions are allowed to mix. The resulting solution is then allowed to evaporate and the residual matrix material and analyte material form small crystals. The sample or target plate is then placed in a mass spectrometer and the sample or target plate is irradiated with a pulsed laser. The crystals are normally irradiated with ultra violet (UV) light, although infra red (IR) light may be used with certain matrix materials.

Since the ions are generated using a pulsed laser beam, the resulting ions are produced in short pulses. A particularly convenient type of mass spectrometer for analysing ions generated from a pulsed ion source is a Time of Flight ("TOF") mass spectrometer.

Linear Time of Flight mass analysers are known wherein pulses of ions are accelerated with a high voltage, typically between 10 kV and 30 kV. The time the ions take to pass through a flight tube and arrive at an ion detector is recorded. Since the ions are all accelerated to approximately the same kinetic energy then the resulting velocities of the ions will be inversely proportional to the square root of their mass, assuming that the ions are all singly charged. Accordingly, the time for ions to reach the ion detector is also proportional to the square root of their mass.

In a MALDI ion source ions may be desorbed from the surface of a sample or target plate with a range of velocities. The mean velocity of the desorbed ions has been determined to be approximately independent of the mass to charge ratio of the ions and is typically between 300–600 m/s. The actual mean velocity of the desorbed ions will depend upon the laser power used and the size and nature of the sample and matrix crystals. It has been observed that the desorbed ions tend to have a considerable range of velocities about the mean velocity. As a consequence, the ions accelerated into a Time of Flight mass spectrometer will normally have a wide range of ion energies which can create problems when using a Time of Flight mass analyser.

In a linear Time of Flight mass spectrometer the arrival time of ions at the ion detector is dependent upon the energy of the ions. Accordingly, if the ions released from an ion source have a range of kinetic energies then they will also have a range of arrival times. This gives rise to broad mass peaks and poor mass resolution.

It is known to attempt to address this problem by using a reflectron wherein ions are reflected through nearly 180° and pass back through a portion of the flight tube to the ion detector. Ions that have relatively higher initial kinetic energies prior to entering the reflectron will therefore penetrate further into the reflectron before being reflected. Ions having relatively higher kinetic energies will therefore have a further overall distance to travel. In this way ions which are initially faster and more energetic can be made to travel a greater distance before striking the ion detector. If the mean flight path in the reflectron is arranged appropriately, then to a first approximation ions can be arranged to arrive at the ion detector substantially independent of the kinetic energy which they possess upon arriving at the acceleration region of the Time of Flight mass analyser. Using a reflectron therefore results in narrower observed mass peaks and an improved mass resolution. A MALDI ion source coupled to a Time of Flight mass analyser incorporating a reflectron is therefore able to achieve a higher mass resolution than a MALDI ion source coupled to a linear Time of Flight mass analyser without a reflectron.

A MALDI Time of Flight mass analyser incorporating a reflectron is also able to separate and analyse fragment ions resulting from parent ions which spontaneously decompose during flight. Such parent ions are generally metastable ions and the process of decomposition in flight is commonly referred to as Post Source Decay ("PSD"). The decomposition of parent ions may also be induced by collision with gas molecules in, for example, a fragmentation or collision cell. Such a process is commonly referred to as Collision Induced Decomposition ("CID").

Fragment ions which are produced in a field free flight region can be considered to retain, to a first approximation, essentially the same velocity as their corresponding parent ions (although in reality the velocity of the fragment ions may be very slightly increased or decreased as a result of energy released during the decomposition reaction). Therefore, to a first approximation, the fragment ions will arrive at the ion detector of a linear Time of Flight mass spectrometer which does not have a reflectron at substantially the same time as any corresponding unfragmented parent ions. Parent ions and corresponding fragment ions are not therefore substantially temporally separated using a linear Time of Flight mass analyser which does not have a reflectron. If a mass spectrometer incorporating a reflectron is used then the situation is different. Since a fragment ion has approximately the same velocity as its corresponding parent ion, but has a lower mass, then it follows that the fragment ion must have a lower kinetic energy than that of its corresponding parent ion. For example, if a parent ion has a mass to charge ratio of 2000 and the parent ion fragments into a fragment ion having a mass to charge ratio of 1000, then the fragment ion will possess only half the kinetic energy which the parent ion originally had. The ratio of the kinetic energies of the fragment and parent ions will be in the same ratio as their masses. Since the fragment ion will have a lower kinetic energy than its corresponding parent ion, the fragment ion will penetrate to a shallower depth into the reflectron and will therefore follow a shorter overall path. Consequently, if fragment ions are formed either by CID or by PSD in a mass spectrometer incorporating a reflectron then such fragment ions will arrive at the ion detector before any corresponding related unfragmented parent ions. If the reflectron is optimised to reflect lower energy fragment ions then more energetic parent ions will not be reflected by the reflectron and hence such parent ions may become lost to the system. Therefore, it is possible to separate fragment ions from any corresponding unfragmented parent ions using an appropriately arranged Time of Flight mass analyser incorporating a reflectron and to separately record and mass analyse the fragment ions.

The analysis of fragment ions is particularly useful for determining the structure and identity of corresponding parent ions. For bio-polymer ions it may be possible to deduce their molecular sequence from fragment ion and parent ion data.

In order to analyse PSD fragment ions a Time of Flight mass analyser incorporating a reflectron may be used. In a linear field reflectron the optimal energy focusing at the ion detector is achieved when the time of flight within the reflectron is approximately equal to the overall time of flight in the field free region upstream and downstream of the reflectron. The time of flight of fragment ions in the reflectron region depends upon the depth of penetration of the fragment ions into the reflectron. For relatively low energy fragment ions the depth of penetration into the reflectron may be increased such that the depth of penetration of the ions is closer to the optimum. This can be achieved by stepping down the reflectron voltage. The reflectron voltage may, for example, be stepped through a number of voltage settings. A 25% reduction in reflectron voltage from step to step may be used to progressively focus fragment ions having lower mass to charge ratios and hence lower kinetic energies. Selected data (or segments of individual mass spectra) relating to ions focussed by the reflectron from each step may then be merged or stitched together to form a single or composite mass spectrum relating to all the various fragment ions produced from the fragmentation of a particular parent ion.

A known MALDI Time of Flight mass spectrometer used to analyse fragment ions comprises a timed electrostatic deflecting system or ion gate situated in a flight tube upstream of the Time of Flight mass analyser. The ion gate is arranged such as to allow only ions having a specific velocity to pass therethrough. The timing of the ion gate is such that only parent ions having a small range of mass to charge ratios will be transmitted by the ion gate. Any fragment ions produced by fragmentation of parent ions upstream of the ion gate will also travel at essentially the same velocity as the corresponding unfragmented parent ions. Accordingly, such fragment ions will also be transmitted by the ion gate at substantially the same time as related unfragmented parent ions. Therefore, the use of the ion gate allows the recording of fragment ions originating from just one particular parent ion (or from a smaller number of parent ions).

The known mass spectrometer suffers from a number of problems associated with the use of a timed ion gate to select particular ions. Timed ion gates have the disadvantage that they can perturb the motion of the ions of interest i.e. those ions intended to be transmitted by the ion gate. Transmitted ions can also be axially and/or radially accelerated or decelerated by stray electric fields from the ion gate. The fast electronic pulse required to gate the ions may also be too slow or may overshoot and oscillate. This adversely affects both the parent ion and the fragment ion mass resolution and the overall ion transmission of the mass spectrometer. Low energy fragment ions are particularly vulnerable to the affects of stray electric fields from the ion gate.

A known ion gate as used in a conventional mass spectrometer comprises a Bradbury Nielson ion gate. A Bradbury Nielson ion gate comprises parallel wires with voltages of alternating polarity applied to successive wires to minimise stray fields. Such an arrangement suffers from the problem that the parallel wires may reduce ion transmission since some ions will strike the wires and become neutralised.

Other effects resulting from the use of ion gates can also be detrimental. For example, ions that are deliberately deflected by an ion gate can strike other parts of the mass spectrometer and may produce scattered ions (or other secondary particles) by sputtering, secondary ion emission, surface induced decomposition or similar processes. As a result, the observation of less intense fragment ions from less intense parent ions in complex mixtures may be obscured by the presence of scattered or secondary ions caused by the deliberate deflection of more abundant ions when the ion gate is closed.

Another problem with using a timed ion gate is that it only allows a fragment ion spectrum for one particular parent ion to be recorded at any one time. Therefore, in order, for example, to characterise a complex mixture of peptide ions by PSD it is necessary to set the ion gate to transmit each individual parent peptide ion in the mixture in turn and to separately record the corresponding fragment ion spectrum for each parent ion by stepping down the voltage applied to the reflectron. It can therefore take a considerable amount of time to obtain fragment ion spectra for all the parent ions. Furthermore, the conventional approach can consume relatively small samples before all parent peptide ions have been analysed. This problem is also further compounded by the fact that not all parent peptide ions will yield useful fragment ions by PSD. However, it will not be known which parent peptide ions will yield the most useful data until after all parent ions been individually analysed. As a result, a lot of time and sample may be consumed acquiring PSD fragment ion data from less productive or relating to less interesting parent peptide ions. In some cases all of the sample may be consumed before any useful or interesting data has been acquired.

On the other hand, if a timed ion gate is not incorporated into a conventional mass analyser then all the fragment ions resulting from fragmentation of all the numerous parent ions will be transmitted and recorded at the same time. Accordingly, if the sample being analysed comprises a complex mixture of different parent peptide ions then the resulting mass spectrum will be impossible to analyse since the mass spectrum will be completely swamped with mass peaks and it will not be known which of very numerous observed fragment ions correspond with which parent ions. As a consequence, it will not be possible to relate observed fragment ions to particular parent ions and hence no useful information can be obtained if a conventional mass spectrometer is used without an ion gate.

It is therefore desired to provide an improved mass spectrometer and method of mass spectrometry.

SUMMARY OF THE INVENTION

According to an aspect of the present invention there is provided a method of mass spectrometry comprising:

providing a Time of Flight mass analyser comprising an ion mirror;

maintaining the ion mirror at a first setting;

obtaining first time of flight or mass spectral data when the ion mirror is at the first setting;

maintaining the ion mirror at a second different setting;

obtaining second time of flight or mass spectral data when the ion mirror is at the second setting;

determining a first time of flight of first fragment ions having a certain mass or mass to charge ratio when the ion mirror is at the first setting;

determining a second different time of flight of first fragment ions having the same certain mass or mass to charge ratio when the ion mirror is at the second setting; and determining from the first and second times of flight either the mass or mass to charge ratio of parent ions which fragmented to produce the first fragment ions and/or the mass or mass to charge ratio of the first fragment ions.

The ion mirror preferably comprises a reflectron which may be either a linear electric field reflectron or a non-linear electric field reflectron.

The method preferably further comprises providing an ion source and a drift or flight region upstream of the ion mirror, wherein when the ion mirror is at the first setting a first potential difference is maintained between the ion source and the drift or flight region and when the ion mirror is at the second setting a second potential difference is maintained between the ion source and the drift or flight region.

In one embodiment the first potential difference is substantially the same as the second potential difference.

In another embodiment the first potential difference is substantially different to the second potential difference. Preferably, the difference between the first potential difference and the second potential difference is p % of the first or second potential difference, wherein p falls within a range selected from the group consisting of: (i) <1; (ii) 1–2; (iii) 2–3; (iv) 3–4; (v) 4–5; (vi) 5–6; (vii) 6–7; (viii) 7–8; (ix) 8–9; (x) 9–10; (xi) 10–15; (xii) 15–20; (xiii) 20–25; (xiv) 25–30; (xv) 30–35; (xvi) 35–40; (xvii) 40–45; (xviii) 45–50; and (xix) >50.

The difference between the first potential difference and the second potential difference may be selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

The first potential difference and/or the second potential difference preferably fall within a range selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

Preferably, when the ion mirror is at the first setting a first electric field strength or gradient is maintained along at least 10%, 20%, 30%, 40%, 50%, 60%, 70%, 80%, 90%, 95% or 100% of the length of the ion mirror and when the ion mirror is at the second setting a second electric field strength or gradient is maintained along at least 10%, 20%, 30%, 40%, 50%, 60%, 70%, 80%, 90%, 95% or 100% of the length of the ion mirror.

The first electric field strength or gradient may be substantially the same as the second electric field strength or gradient. Alternatively, the first electric field strength or gradient may be substantially different to the second electric field strength or gradient.

Preferably, the difference between the first electric field strength or gradient and the second electric field strength or gradient is q % of the first or second electric field strength or gradient, wherein q falls within a range selected from the group consisting of: (i) <1; (ii) 1–2; (iii) 2–3; (iv) 3–4; (v) 4–5; (vi) 5–6; (vii) 6–7; (viii) 7–8; (ix) 8–9; (x) 9–10; (xi) 10–15; (xii) 15–20; (xiii) 20–25; (xiv) 25–30; (xv) 30–35; (xvi) 35–40; (xvii) 40–45; (xviii) 45–50; and (xix) >50.

The difference between the first electric field strength or gradient and the second electric field strength or gradient may be selected from the group consisting of: (i) <0.01 kV/cm; (ii) 0.01–0.1 kV/cm; (iii) 0.1–0.5 kV/cm; (iv) 0.5–1 kV/cm; (v) 1–2 kV/cm; (vi) 2–3 kV/cm; (vii) 3–4 kV/cm; (viii) 4–5 kV/cm; (ix) 5–6 kV/cm; (x) 6–7 kV/cm; (xi) 7–8 kV/cm; (xii) 8–9 kV/cm; (xiii) 9–10 kV/cm; (xiv) 10–11 kV/cm; (xv) 11–12 kV/cm; (xvi) 12–13 kV/cm; (xvii) 13–14 kV/cm; (xviii) 14–15 kV/cm; (xix) 15–16 kV/cm; (xx) 16–17 kV/cm; (xxi) 17–18 kV/cm; (xxii) 18–19 kV/cm; (xxiii) 19–20 kV/cm; (xxiv) 20–21 kV/cm; (xxv) 21–22 kV/cm; (xxvi) 22–23 kV/cm; (xxvii) 23–24 kV/cm; (xxviii) 24–25 kV/cm; (xxix) 25–26 kV/cm; (xxx) 26–27 kV/cm; (xxxi) 27–28 kV/cm; (xxxii) 28–29 kV/cm; (xxxiii) 29–30 kV/cm; and (xxxiv) >30 kV/cm.

Preferably, the first electric field strength or gradient and/or the second electric field strength or gradient fall within a range selected from the group consisting of: (i) <0.01 kV/cm; (ii) 0.01–0.1 kV/cm; (iii) 0.1–0.5 kV/cm; (iv) 0.5–1 kV/cm; (v) 1–2 kV/cm; (vi) 2–3 kV/cm; (vii) 3–4 kV/cm; (viii) 4–5 kV/cm; (ix) 5–6 kV/cm; (x) 6–7 kV/cm; (xi) 7–8 kV/cm; (xii) 8–9 kV/cm; (xiii) 9–10 kV/cm; (xiv) 10–11 kV/cm; (xv) 11–12 kV/cm; (xvi) 12–13 kV/cm; (xvii) 13–14 kV/cm; (xviii) 14–15 kV/cm; (xix) 15–16 kV/cm; (xx) 16–17 kV/cm; (xxi) 17–18 kV/cm; (xxii) 18–19 kV/cm; (xxiii) 19–20 kV/cm; (xxiv) 20–21 kV/cm; (xxv) 21–22 kV/cm; (xxvi) 22–23 kV/cm; (xxvii) 23–24 kV/cm; (xxviii) 24–25 kV/cm; (xxix) 25–26 kV/cm; (xxx) 26–27 kV/cm; (xxxi) 27–28 kV/cm; (xxxii) 28–29 kV/cm; (xxxiii) 29–30 kV/cm; and (xxxiv) >30 kV/cm.

In the preferred method, when the ion mirror is at the first setting the ion mirror is maintained at a first voltage and when the ion mirror is at the second setting the ion mirror is maintained at a second voltage. The the first voltage may be substantially the same as the second voltage or may be substantially different to the second voltage.

In a preferred embodiment the difference between the first voltage and the second voltage is r % of the first or second voltage, wherein r falls within a range selected from the group consisting of: (i) <1; (ii) 1–2; (iii) 2–3; (iv) 3–4; (v) 4–5; (vi) 5–6; (vii) 6–7; (viii) 7–8; (ix) 8–9; (x) 9–10; (xi) 10–15; (xii) 15–20; (xiii) 20–25; (xiv) 25–30; (xv) 30–35; (xvi) 35–40; (xvii) 40–45; (xviii) 45–50; and (xix) >50.

Preferably, the difference between the first voltage and the second voltage is selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

Preferably, the first voltage and/or the second voltage fall within a range selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

The preferred method, further comprises providing an ion source, such that when the ion mirror is at the first setting the ion mirror is maintained at a first potential relative to the potential of the ion source and when the ion mirror is at the second setting the ion mirror is maintained at a second potential relative to the potential of the ion source. The first potential may be substantially the same as the second potential or may be substantially different from the second potential.

In a preferred embodiment, the difference between the first potential and the second potential is s % of the first or second potential, wherein s falls within a range selected from the group consisting of: (i) <1; (ii) 1–2; (iii) 2–3; (iv) 3–4; (v) 4–5; (vi) 5–6; (vii) 6–7; (viii) 7–8; (ix) 8–9; (x) 9–10; (xi) 10–15; (xii) 15–20; (xiii) 20–25; (xiv) 25–30; (xv) 30–35; (xvi) 35–40; (xvii) 40–45; (xviii) 45–50; and (xix) >50.

Preferably, the potential difference between the first potential and the potential of the ion source and/or the second potential and the potential of the ion source falls within a range selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

Preferably, the first potential and/or the second potential fall within a range selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

The preferred method further comprises providing an ion source selected from the group consisting of: (i) an Electrospray ("ESI") ion source; (ii) an Atmospheric Pressure Chemical Ionisation ("APCI") ion source; (iii) an Atmospheric Pressure Photo Ionisation ("APPI") ion source; (iv) a Laser Desorption Ionisation ("LDI") ion source; (v) an Inductively Coupled Plasma ("ICP") ion source; (vi) an Electron Impact ("EI") ion source; (vii) a Chemical Ionisation ("CI") ion source; (viii) a Field Ionisation ("FI") ion source; (ix) a Fast Atom Bombardment ("FAB") ion source; (x) a Liquid Secondary Ion Mass Spectrometry ("LSIMS") ion source; (xi) an Atmospheric Pressure Ionisation ("API") ion source; (xii) a Field Desorption ("FD") ion source; (xiii) a Matrix Assisted Laser Desorption Ionisation ("MALDI") ion source; and (xiv) a Desorption/Ionisation on Silicon ("DIOS") ion source.

The ion source may be a continuous ion source or a pulsed ion source.

Preferably, the method further comprises providing a drift or flight region upstream of the ion mirror, wherein when the ion mirror is at the first setting the ion mirror is maintained at a first potential relative to the potential of the drift or flight region and when the ion mirror is at the second setting the ion mirror is maintained at a second potential relative to the potential of the drift or flight region. In this embodiment the first potential may substantially the same as the second potential or may be substantially different to the second potential.

In a preferred embodiment the difference between the first potential and the second potential is t % of the first or second potential, wherein t falls within a range selected from the group consisting of: (i) <1; (ii) 1–2; (iii) 2–3; (iv) 3–4; (v) 4–5; (vi) 5–6; (vii) 6–7; (viii) 7–8; (ix) 8–9; (x) 9–10; (xi) 10–15; (xii) 15–20; (xiii) 20–25; (xiv) 25–30; (xv) 30–35; (xvi) 35–40; (xvii) 40–45; (xviii) 45–50; and (xix) >50.

The difference between the first potential and the second potential preferably falls within a range selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv)

600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

Preferably, the first potential and/or the second potential fall within a range selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

In the preferred method, when the ion mirror is at the first setting ions having a certain mass to charge ratio and/or a certain energy penetrate at least a first distance into the ion mirror and when the ion mirror is at the second setting ions having the certain mass to charge ratio and/or the certain energy penetrate at least a second different distance into the ion mirror.

Preferably, the difference between the first and second distance is u % of the first or second distance, wherein u falls within a range selected from the group consisting of: (i) <1; (ii) 1–2; (iii) 2–3; (iv) 3–4; (v) 4–5; (vi) 5–6; (vii) 6–7; (viii) 7–8; (ix) 8–9; (x) 9–10; (xi) 10–15; (xii) 15–20; (xiii) 20–25; (xiv) 25–30; (xv) 30–35; (xvi) 35–40; (xvii) 40–45; (xviii) 45–50; and (xix) >50.

In the preferred method, the steps of determining the first time of flight of the first fragment ions and the second time of flight of the first fragment ions comprises recognising, determining, identifying or locating first fragment ions in the first time of flight or mass spectral data and recognising, determining, identifying or locating corresponding first fragment ions in the second time of flight data.

In this embodiment, the step of recognising, determining, identifying or locating first fragment ions in the first time of flight or mass spectral data is preferably made manually and/or automatically and wherein the step of recognising, determining, identifying or locating first fragment ions in the second time of flight or mass spectral data is made manually and/or automatically.

The step of recognising, determining, identifying or locating first fragment ions in the first and/or the second time of flight or mass spectral data preferably comprises comparing a pattern of isotope peaks in the first time of flight or mass spectral data with a pattern of isotope peaks in the second time of flight or mass spectral data.

In a preferred embodiment, the step of comparing the pattern of isotope peaks comprises comparing the relative intensities of isotope peaks and/or the distribution of isotope peaks. The step of recognising, determining, identifying or locating first fragment ions in the first and/or the second time of flight or mass spectral data may also, or alternatively, comprise comparing the intensity of ions in the first time of flight or mass spectral data with the intensity of ions in the second time of flight or mass spectral data.

Preferably, the step of recognising, determining, identifying or locating first fragment ions in the first and/or the second time of flight or mass spectral data comprises comparing the width of one or more mass spectral peaks in a first mass spectrum produced from the first time of flight or mass spectral data with the width of one or more mass spectral peaks in a second mass spectrum produced from the second time of flight or mass spectral data.

The preferred method further comprises obtaining a parent ion mass spectrum. Preferably, the method further comprises determining the mass or mass to charge ratio of one or more parent ions from the parent ion mass spectrum.

In this embodiment, the method may further comprise determining the time of flight of one or more fragment ions from the first time of flight or mass spectral data. Preferably, the method further comprises predicting the mass or mass to charge ratio which a first possible fragment ion would have based upon the mass or mass to charge ratio of a parent ion as determined from the parent ion mass spectrum and the time of flight of a fragment ion as determined from the first time of flight or mass spectral data.

In another embodiment the method comprises predicting the masses or mass to charge ratios which first possible fragment ions would have based upon the mass or mass to charge ratio of one or more parent ions as determined from the parent ion mass spectrum and the time of flight of one or more fragment ions as determined from the first time of flight or mass spectral data.

Preferably, the method comprises determining the time of flight of one or more fragment ions from the second time of flight or mass spectral data. This preferably involves predicting the mass or mass to charge ratio which a second possible fragment ion would have based upon the mass or mass to charge ratio of a parent ion as determined from the parent ion mass spectrum and the time of flight of a fragment ion as determined from the second time of flight or mass spectral data.

In another embodiment, the method comprises predicting the masses or mass to charge ratios which second possible fragment ions would have based upon the mass to charge ratio of one or more parent ions as determined from the parent ion mass spectrum and the time of flight of one or more fragment ions as determined from the second time of flight or mass spectral data.

The preferred method comprises comparing or correlating the predicted mass or mass to charge ratio of one or more first possible fragment ions with the predicted mass or mass to charge ratio of one or more second possible fragment ions.

The method may also involve recognising, determining or identifying fragment ions in the first time of flight or mass spectral data as relating to the same species of fragment ions in the second time of flight or mass spectral data if the predicted mass or mass to charge ratio of the one or more first possible fragment ions corresponds to within x % of the predicted mass or mass to charge ratio of the one or more second possible fragment ions. Preferably, x falls within the range selected from the group consisting of: (i) <0.001; (ii) 0.001–0.01; (iii) 0.01–0.1; (iv) 0.1–0.5; (v) 0.5–1.0; (vi) 1.0–1.5; (vii) 1.5–2.0; (viii) 2–3; (ix) 3–4; (x) 4–5; and (xi) >5.

Preferably, the step of determining from the first and second times of flight the mass or mass to charge ratio of parent ions which fragmented to produce the first fragment ions comprises; determining the mass to charge ratio of the parent ions which fragmented to produce the first fragment ions independently or without requiring knowledge of the mass or mass to charge ratio of the first fragment ions.

In a preferred embodiment, the step of determining the mass or mass to charge ratio of the parent ions which fragmented to produce the first fragment ions independently or without requiring knowledge of the mass or mass to charge ratio of the first fragment ions comprises; determining from a parent ion mass spectrum whether one or more parent ion mass peaks are observed within y % of the predicted mass or mass to charge ratio of the parent ions which were determined to have fragmented to produce the first fragment ions. Preferably, y falls within the range selected from the group consisting of: (i) <0.001; (ii) 0.001–0.01; (iii) 0.01–0.1; (iv) 0.1–0.5; (v) 0.5–1.0; (vi) 1.0–1.5; (vii) 1.5–2.0; (viii) 2–3; (ix) 3–4; (x) 4–5; and (xi) >5.

Preferably, if one parent ion mass peak is observed within y % of the predicted mass or mass to charge ratio of the parent ions which were determined to have fragmented to produce the first fragment ions, then the mass or mass to charge ratio of the parent ion mass peak is taken to be a more accurate determination of the mass or mass to charge ratio of the parent ions which fragmented to produce the first fragment ions.

In another embodiment, if more than one parent ion mass peaks are observed within y % of the predicted mass or mass to charge ratio of the parent ions which were determined to have fragmented to produce the first fragment ions, then a determination is made as to which observed parent ion mass peak corresponds or relates to the most likely parent ion to have fragmented to produce the first fragment ions. In such a method it is preferred that a determination is made as to which observed parent ion mass peak corresponds or relates to the most likely parent ion to have fragmented to produce the first fragment ions by referring to third time of flight or mass spectral data obtained when the ion mirror was maintained at a third different setting.

Preferably, the mass or mass to charge ratio of the observed parent ion mass peak which corresponds or relates to the most likely parent ion to have fragmented to produce the first fragment ions is taken to be a more accurate determination of the mass or mass to charge ratio of the parent ions which fragmented to produce the first fragment ions.

In the preferred embodiment, a more accurate determination of the mass or mass to charge ratio of the first fragment ions is made using the more accurate determination of the mass or mass to charge ratio of the parent ions.

From another aspect the present invention provides a mass spectrometer comprising:

a Time of Flight mass analyser, the Time of Flight mass analyser comprising an ion mirror, wherein, in use, the ion mirror is maintained at a first setting at a first time and first time of flight or mass spectral data is obtained and the ion mirror is maintained at a second different setting at a second time and second time of flight or mass spectral data is obtained; and wherein the mass spectrometer determines in use:

(a) a first time of flight of first fragment ions having a certain mass or mass to charge ratio when the ion mirror is maintained at the first setting;

(b) a second different time of flight of first fragment ions having the same certain mass or mass to charge ratio when the ion mirror is maintained at the second setting; and (c) the mass or mass to charge ratio of parent ions which fragmented to produce the first fragment ions and/or the mass or mass to charge ratio of the first fragment ions from the first and second times of flight.

The preferred embodiment enables the simultaneous acquisition of PSD and/or CID fragment ion spectra from different parent ions using a MALDI Time of Flight mass spectrometer comprising a reflectron but without requiring or needing the use of a timed ion gate. The preferred embodiment therefore avoids all the problems associated with conventional arrangements which require the use of a timed ion gate. A preferred method for interpreting the recorded data is also disclosed.

According to the preferred embodiment the voltage applied to the reflectron which forms part of the Time of Flight mass spectrometer is preferably programmed to vary in a specific sequence such that post source decay fragment ions resulting from the spontaneous or otherwise fragmentation of parent ions will be acquired at substantially the same time. The recorded data is then preferably processed to determine the fragment ion mass to charge ratio and also to predict the corresponding parent ion mass to charge ratio for each observed fragment ion.

The preferred multiplexed system allows PSD data to be acquired much more quickly and with significantly less sample consumption than conventional systems. The elimination of a timed ion gate also results in a mass spectrometer which is less expensive and less complex to manufacture and which is considerably simpler to operate. Advantageously, the PSD data that is acquired according to the preferred embodiment is from all the parent ions in the sample and not just from individually selected parent ions as is the case with conventional arrangements using a timed ion gate. Therefore, PSD data is acquired according to the preferred embodiment with significantly less sample consumption enabling significantly improved limits of detection to be obtained.

In the preferred embodiment the time of flight of PSD fragment ions are determined by reducing the reflectron voltage from a first voltage level to a second relatively close voltage level. The second voltage level is preferably only about 4–5% less than the first voltage level. A relatively small change (e.g. 4–5%) in the applied reflectron voltage will be referred to hereinafter as a minor decrement (or step). A larger change (e.g. 25%) in the reflectron voltage which is used to optimally reflect different energy fragment ions will be referred to hereinafter as a major decrement (or step).

The acquisition of two similar mass spectra at two slightly different reflectron voltages (i.e. wherein the reflectron voltage has been changed only by a minor decrement or step) enables the mass to charge ratio not just of the observed fragment ion but also of the corresponding parent ion from which the fragment ion was derived to be accurately determined.

Once mass spectral data for ions having a particular range of energies has been obtained the reflectron voltage is then preferably reduced by a major decrement or step. The process of accurately determining the parent and fragment ion mass to charge ratios is then preferably repeated. The reflectron voltage is then preferably reduced by another major decrement or step and the process is preferably repeated a number of times so that ions across the mass to charge ratio range of interest are mass analysed.

According to a less preferred embodiment the step of reducing the reflectron voltage by minor decrements or steps may be dispensed with. Instead, selected data obtained after the reflectron voltage has been reduced by successive major decrements or steps may be used to calculate the parent and fragment ion mass to charge ratios for each observed fragment ion in the corresponding mass spectra.

DESCRIPTION OF THE DRAWINGS

Various embodiments of the present invention will now be described, by way of example only, and with reference to the accompanying drawings in which:

FIG. 6 details the masses of three observed parent peptide ions obtained from a digest of ADH and the masses of corresponding observed fragment ions which were sufficient to enable the protein to be uniquely identified;

FIG. 10 shows a, b and y series fragment ions corresponding to the fragmentation of a parent peptide ion having a nominal mass of 2312 Da which was derived from the tryptic digestion of ADH.

DETAILED DESCRIPTION OF THE DRAWINGS

Figure 1:
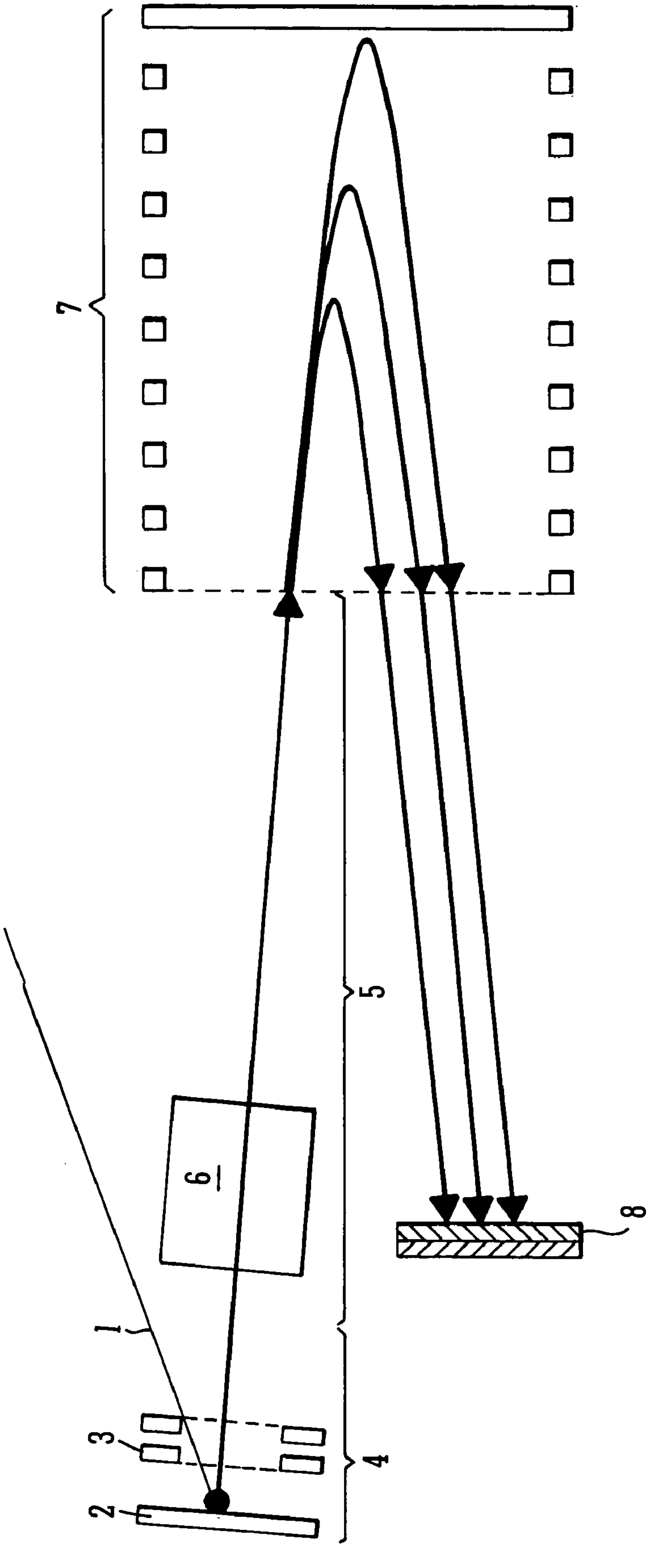
FIG. 1 shows a MALDI Time of Flight mass spectrometer according to a preferred embodiment.

A preferred embodiment will now be described with reference to FIG. 1. FIG. 1 shows a preferred MALDI Time of Flight PSD mass spectrometer. A laser beam 1 is preferably directed onto a sample or target plate 2 which is preferably maintained at a voltage $V_S$. Ions are preferably generated by a MALDI process at the sample or target plate 2. A two stage delayed extraction (or time lag focusing) device 3 may be provided between the sample or target plate 2 and a field free or drift region 5 and if provided may be considered to form part of the ion source 4. The delayed extraction device 3 preferably increases the energy of ions which are initially desorbed from the sample or target plate 2 with relatively low energies. Ions emerging from the ion source 4 are preferably accelerated into a field free or drift region 5 arranged downstream of the ion source 4. The delayed extraction device 3 by increasing the energy of the less energetic ions enables initially slower ions to catch up faster ions in the field free or drift region 5.

The field free or drift region 5 preferably comprises a flight tube which may be grounded relative to the ion source 4. However, according to other less preferred embodiments the flight tube may be maintained at a relatively high voltage and the ion source 4 may be grounded. According to other embodiments, the flight tube and/or ion source 4 may be maintained ad other different potentials or voltages.

According to the preferred embodiment parent ions emitted from the ion source 4 and passing through the field free or drift region 5 will preferably possess a kinetic energy which is approximately equal to $eV_s$ electron volts.

Parent ions may be deliberately fragmented by CID in an optional collision or fragmentation cell 6 which may be provided in the field free region 5. However, more preferably, metastable parent ions may additionally or alternatively be allowed to fragment spontaneously by PSD as the metastable parent ions pass through the field free or drift region 5 without being assisted by a collision or fragmentation cell 6.

Fragment ions formed by CID and/or more preferably by PSD preferably emerge from the field free or drift region 5 and then preferably pass into or otherwise enter an ion mirror 7. The ion mirror 7 preferably comprising a reflectron. The ion mirror 7 is preferably arranged so as to reflect at least some of the fragment ions back out of the ion mirror 7 and towards an ion detector 8 which is preferably arranged downstream of the ion mirror 7. The ion detector 8 may, for example, comprise a microchannel plate ion detector.

The ion mirror 7 may initially be maintained at a voltage, potential, electric field strength or gradient such that fragment ions (which will possess less kinetic energy than corresponding unfragmented parent ions) will be substantially reflected by a retarding electric field within the ion mirror 7 whereas unfragmented parent ions (which will possess relatively higher kinetic energies) will not be reflected by the ion mirror 7. Accordingly, it may be arranged that initially relatively few or substantially no unfragmented parent ions are reflected by the ion mirror 7 and hence most, if not all, of the unfragmented parent ions are allowed to continue through the ion mirror 7 without being reflected and hence being allowed to become lost to the system.

Once the most energetic fragment ions have been optimally reflected by the ion mirror 7 and then subsequently mass analysed, the maximum ion mirror or reflectron voltage, potential, electric field strength or gradient is then preferably progressively stepped down in a series of minor and major decrements or steps in a manner which will be described more fully below. The stepping down of the reflectron voltage, potential, electric field strength or gradient in this manner enables lesser energetic fragment ions to be optimally reflected by the ion mirror 7. At progressively lower reflectron voltage, potential, electric field strength or gradient settings very few, if any, unfragmented parent ions will be reflected by the ion mirror 7. Therefore, the resulting mass spectra will relate almost exclusively to fragment ions.

Although the above described embodiment involves varying the voltage, potential, electric field strength or gradient of the ion mirror 7 or reflectron whilst the voltage or potential of the ion source 4 and/or field free or drift region 5 remain substantially constant, according to other embodiments the potential of the ion mirror 7 or reflectron may be varied more generally relative to either the ion source 4 and/or the field free or drift region 5 i.e. the potential of the ion source 4 and/or the field free or drift region 5 may be varied whilst, for example, the voltage, potential, electric field strength or gradient of the ion mirror 7 or reflectron remains substantially constant. According to an embodiment the potential of the ion source 4 and/or the field free or drift region 5 and/or the ion mirror 7 may be varied.

Figure 2:
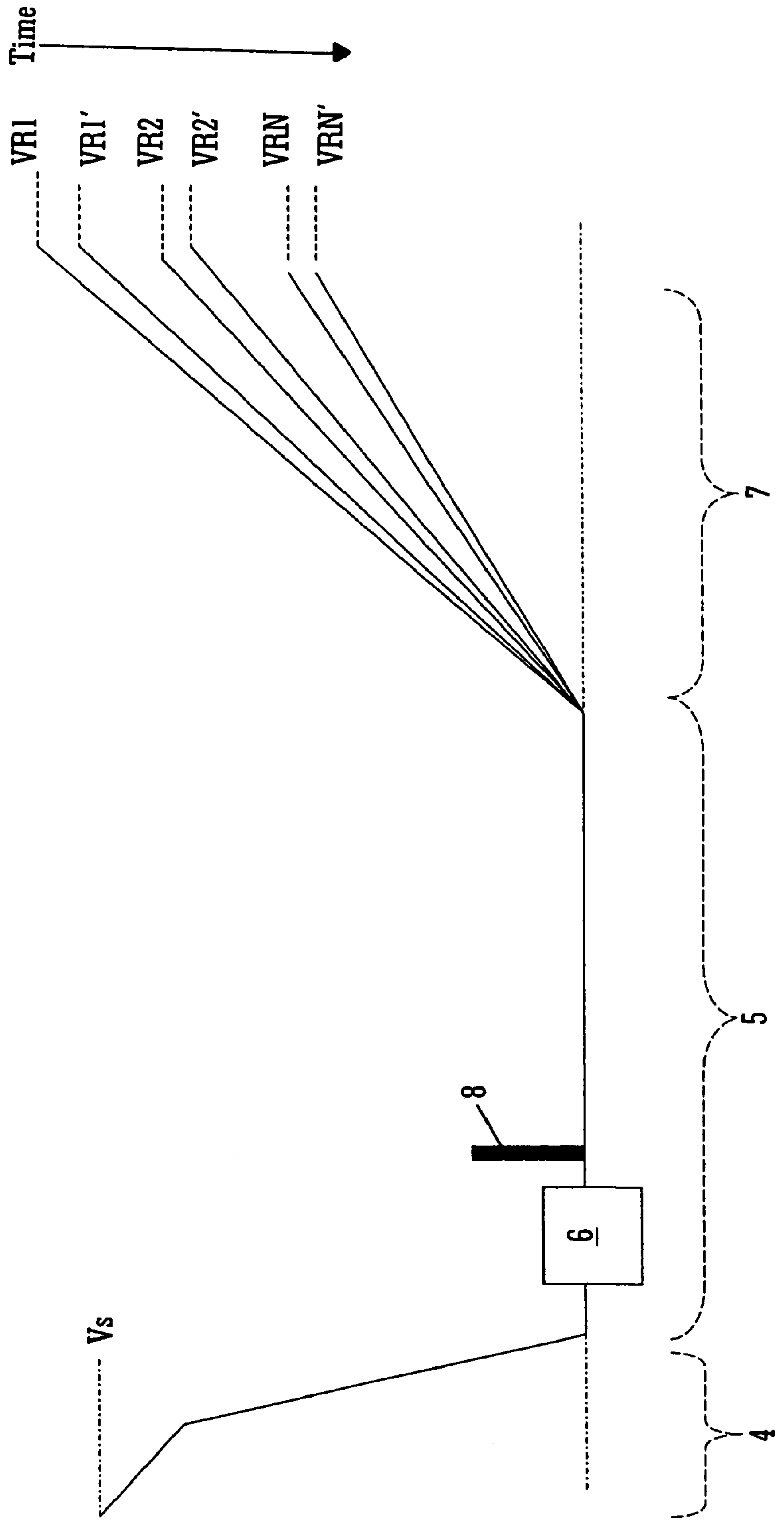
FIG. 2 shows the electrical potentials at which an ion source, a field free region and a reflectron are maintained according to a preferred embodiment.

FIG. 2 illustrates how the ion mirror or reflectron voltage, potential, electric field strength or gradient may be progressively stepped down with time in a series of minor and major decrements according to the preferred embodiment. Initially, first time of flight or mass spectral data is preferably acquired whilst the ion mirror or reflectron 7 is maintained at a first relatively high voltage, potential, electric field strength or gradient VR1 relative to the potential of the field free or drift region 5 (which is preferably held at ground). Since VR1 is relatively high then the first time of flight or mass spectral data will preferably include a relatively large proportion of energetic fragment ions since the ion mirror 7 or reflectron is preferably set at a voltage, potential, electric field strength or gradient such that relatively energetic fragment ions will be optimally reflected. Lower energy fragment ions will also be reflected. It is also possible but not necessarily particularly intended that some low energy parent ions may also be reflected by the ion mirror 7 and hence may be observed in the first time of flight or mass spectral data.

When the first time of flight or mass spectral data is used to produce a mass spectrum then only a limited portion of the mass spectrum will yield potentially useful information. This is because the ion mirror 7 or reflectron was held at a voltage, potential, electric field strength or gradient which was optimised to reflect fragment ions having a relatively small range of mass to charge ratios. Accordingly, a segment of the resulting time of flight or mass spectral data will provide useful information and this usable portion of the mass spectrum will preferably relate to relatively energetic fragment ions and may also include some less energetic parent ions.

According to the preferred embodiment once a first set of time of flight or mass spectral data has been obtained then the maximum reflectron voltage, potential, electric field strength or gradient is then preferably stepped down by a minor decrement (e.g. by 4–5%) to a second slightly lower voltage setting VR1'. Since the reflectron voltage, potential, electric field strength or gradient has not been reduced by very much then essentially the same fragment ions will still be optimally reflected by the ion mirror 7 or reflectron. Second time of flight or mass spectral data is then preferably acquired whilst the ion mirror 7 or reflectron is maintained at this second slightly lower voltage, potential, electric field strength or gradient VR1'. However, although essentially the same fragment ions will be optimally reflected there will be a discernable increase in the observed time of flight of ions having a particular mass to charge ratio due to the voltage, potential, electric field strength or gradient applied to the ion mirror 7 or reflectron being reduced. As a result there will be an observed difference in the flight time for ions having a particular mass to charge ratio at the two slightly different reflectron voltage, potential, electric field strength or gradient settings VR1 and VR1'. The difference in flight time can be used to provide an accurate prediction or estimate of the mass to charge ratio of the parent ion which fragmented to produce the observed fragment ion. This prediction or estimate of the mass to charge ratio of the parent ion can be obtained solely from the time of flight data relating to fragment ions and does not require a parent ion scan to be performed. In a similar manner to the first time of flight or mass spectral data, a segment of the second time of flight or mass spectral data will provide useful information. The usable portion of the second time of flight or mass spectral data will preferably generally correspond with essentially the same usable portion of the first time of flight or mass spectral data.

The acquisition of first and second time of flight or mass spectral data at two slightly different reflectron voltages or slightly different potentials relative to the ion source 4 and/or field free or drift region 5 (or electric field strengths or gradients) allows the mass to charge ratios of the fragment ions which are optimally reflected by the ion mirror 7 or reflectron to be calculated. Similarly, the mass to charge ratio of the parent ions which fragmented to produce the fragment ions can also additionally or alternatively be determined accurately.

In order to observe and identify fragment ions across a wide range of mass to charge ratios and to determine the mass to charge ratio of parent ions corresponding to such fragment ions, the maximum reflectron voltage is preferably progressively stepped down by a major decrement after each minor decrement. Each major decrement may involve, for example, a reduction of the reflectron voltage, potential, electric field strength or gradient or of the maximum potential of the ion mirror 7 relative to the ion source 4 and/or field free or drift region 5 of about 25%.

In the particular example shown in FIG. 2 after the ion mirror 7 or reflectron has been maintained at the second voltage, potential, electric field strength or gradient VR1' and after second time of flight or mass spectral data has been acquired at this setting, the reflectron voltage, potential, electric field strength or gradient is then preferably stepped down by a major decrement of, for example, 25% to a new third voltage VR2. Third time of flight or mass spectral data is then preferably acquired at this third reflectron voltage, potential, electric field strength or gradient VR2. In a similar manner to the first minor decrement (when the reflectron voltage, potential, electric field strength or gradient was reduced from VR1 to VR1'), the reflectron voltage, potential, electric field strength or gradient is then preferably stepped down again by a similar minor decrement (e.g. by 4–5%) to a fourth voltage, potential, electric field strength or gradient VR2'. Fourth time of flight mass spectral data is then preferably acquired at this fourth reflectron voltage, potential, electric field strength or gradient VR2'.

The process of decreasing the reflectron voltage, potential, electric field strength or gradient in major decrements of e.g. 25% interspersed with decreasing the reflectron voltage, potential, electric field strength or gradient by a minor decrement of e.g. 4–5% is preferably continued several times until sufficient time of flight or mass spectral data across the whole of the desired mass to charge ratio range has been acquired or obtained. According to an embodiment the usable portions or segments of time of flight or mass spectral data acquired at each reflectron voltage or relative ion mirror potential may be selected from each time of flight or mass spectral set of data. Multiple usable portions or segments of data may then be used enabling one or more composite mass spectra to be formed.

Reducing the relative potential of the ion mirror 7 or reducing the reflectron voltage by, for example, 25% at each major decrement means that in the example shown and described in relation to FIG. 2 the voltage ratio VR2/VR1=0.75. Similarly, the voltage ratio VR3/VR2=0.75 and more generally the voltage ratio VRN/VRN−1=0.75. Likewise, reducing the reflectron voltage by 4% at each minor decrement means that the voltage ratio VR1'/VR1=0.96. Similarly, the voltage ratio VR2'/VR2=0.96 and more generally the voltage ratio VRN'/VRN=0.96.

According to other embodiments major and/or minor decrements or steps in the ion mirror or reflectron voltage or relative potential may be smaller or larger than as stated above. For example, a minor decrement or step in the ion mirror reflectron voltage, relative potential, potential, electric field strength or gradient may be <1%, 1–2%, 2–3%, 3–4%, 4–5%, 5–6%, 6–7%, 7–8%, 8–9%, 9–10% or >10%. A major decrement or step in the ion mirror or reflectron voltage, relative potential, potential, electric field strength or gradient may be <10%, 10–15%, 15–20%, 20–25%, 25–30%, 30–35%, 35–40%, 40–45%, 45–50% or >50%.

According to an embodiment in order to obtain a mass spectrum across the whole of a desired mass to charge ratio range, the ion mirror or reflectron voltage or relative potential may be reduced by 10–20 major decrements or steps, each major decrement or step together with 10–20 minor decrements or steps interspersed therewith. As a result the ion mirror reflectron voltage or relative potential may therefore be reduced, for example, 20–40 times in total in order to obtain a complete PSD spectrum with sufficient data to determine the mass to charge ratios of all the fragment ions and their corresponding parent ions across the mass to charge ratio range of interest.

According to the preferred embodiment, the ion mirror or reflectron voltage or relative potential is altered, preferably reduced, so that two (or more) independent sets of time of flight or mass spectral data are acquired at slightly different ion mirror or reflectron voltage or relative potential settings. The measurement of two different times of flight $T_f, T_f'$ for the same species of fragment ion at two slightly different ion mirror or reflectron voltages or relative potential settings makes it possible, by solving two simultaneous equations, to deduce both the mass to charge ratio of the observed fragment ion and also the mass to charge ratio of the parent ion which fragmented to produce the fragment ion.

The time of flight $T_f$ of a fragment ion in a mass spectrometer according to the preferred embodiment incorporating a reflectron is given by:

$$T_f = a\sqrt{M_p} + b\frac{M_d}{M_p}\sqrt{M_p}$$

where $M_p$ is the mass of a singly charged parent ion, $M_d$ is the mass of the observed singly charged daughter or fragment ion and the coefficients a and b are instrument coefficients which depend upon the particular voltages applied to the ion optical components of the mass spectrometer and the dimensions of the mass spectrometer.

The first part of the equation ($a\sqrt{M_p}$) represents the time of flight of the fragment ion from the ion source 4 as it passes through the field free or drift region 5 to reach the entrance to the ion mirror 7 or reflectron. The second part of the equation ($b\cdot(M_d/M_p)\cdot\sqrt{M_p}$) represents the additional time of flight of the fragment ion once it has entered the ion mirror 7 or reflectron, reverses direction and is reflected back out of the ion mirror 7 or reflectron. The coefficient b is inversely proportional to the ion mirror or reflectron voltage or relative potential. Therefore, as the ion mirror or reflectron voltage is reduced, the fragment ions will spend longer in the ion mirror 7 reflectron and hence coefficient b will increase.

The coefficients a and b may be calculated if all instrument parameters are known. However, more preferably, the coefficients a and b may be experimentally measured or determined using a suitable calibration compound. For example, the time of flight of a number of known PSD fragment ions from a calibrant compound at each different ion mirror or reflectron voltage, relative potential, potential, electric field strength or gradient setting may be measured. The coefficients a and b can then preferably be experimentally determined for each different ion mirror or reflectron setting using the above equations. To a first approximation the coefficient a may be considered to be invariant with ion mirror or reflectron voltage or relative potential and hence coefficient a does not necessarily have to be recalculated at each ion mirror or reflectron voltage setting.

When the ion mirror or reflectron voltage or relative potential is reduced by a minor decrement or step of e.g. 4–5%, the resulting longer time of flight $T_f'$ of a particular species of fragment ion together with a corresponding increased coefficient b' may then be measured. Three coefficients a, b and b' can therefore be experimentally determined. Once these instrument coefficients have been determined for one, two or more than two ion mirror or reflectron voltage, relative potential, potential, electric field strength or gradient settings then PSD spectra (i.e. time of flight or mass spectral data) from an unknown substance can then be acquired. The PSD spectra for the unknown substance may be acquired at substantially the same ion mirror or reflectron voltage or relative potential settings as were used for calibration. However, according to other embodiments the PSD data of the unknown sample may be acquired at slightly or substantially different ion mirror or reflectron voltage or relative potential settings to the voltage or relative potential settings at which the instrument coefficients were determined. Accordingly, the instrument coefficients a, b and b' may be determined by interpolation of or with reference to a calibration curve. Once the instrument coefficients have been determined, the PSD spectra (i.e. time of flight or mass spectral data) can then be analysed to determine the mass to charge ratio of the observed fragment ion and/or to determine the mass to charge ratio of the parent ion from which the fragment ion was derived.

It will be appreciated that when the ion mirror or reflectron voltage or relative potential is changed (e.g. reduced) then the resulting change (e.g. increase) in the time of flight $\Delta T_f$ for a particular species of fragment ion will be proportional to the change in coefficient b which is dependent upon the ion mirror or reflectron voltage or relative potential:

$$\Delta T_f = \Delta b\frac{M_d}{M_p}\sqrt{M_p}$$

where $\Delta b = b' - b$. Since $T_f$, $\Delta T_f$, a, b, b' (and hence $\Delta b$) are all known, then by solving the two simultaneous equations above both the mass to charge ratio $M_d$ of the fragment ion and the mass to charge ratio $M_p$ of the corresponding parent ion can be determined. The parent ion mass to charge ratio $M_p$ and the fragment ion mass to charge ratio $M_d$ are given by:

$$M_p = \left(\frac{T_f}{a} - \frac{b}{a}\frac{\Delta T_f}{\Delta b}\right)^2$$

$$M_d = \frac{\Delta T_f}{\Delta b}\left(\frac{T_f}{a} - \frac{b}{a}\frac{\Delta T_f}{\Delta b}\right)$$

Having predicted or estimated the mass to charge ratio of parent ions which fragmented to produce the observed fragment ions, a conventional parent ion mass spectrum may then be obtained, acquired or referred to. Predicted parent ion mass to charge ratios based on the PSD acquisition of the fragment ions may then be matched to or compared with parent ions observed in the parent ion mass spectrum. Having predicted the mass to charge ratio of a parent ion and then having matched the predicted parent ion to an actual parent ion in a parent ion mass spectrum it is then possible to improve the determination of the mass to charge ratio $M_d$ of the fragment ion by using the experimentally determined value of the mass to charge ratio $M_p$ of the parent ion in the above equations. As a result, both the mass to charge ratio of a parent ion and the mass to charge ratio of its corresponding fragment ion can be determined very accurately.

In order to illustrate the efficacy of the preferred embodiment, a 10 pmol tryptic protein digest of Alcohol Dehydrogenase (ADH1 (yeast)) obtained from Waters Inc., Milford, USA was analysed.

Figure 3:
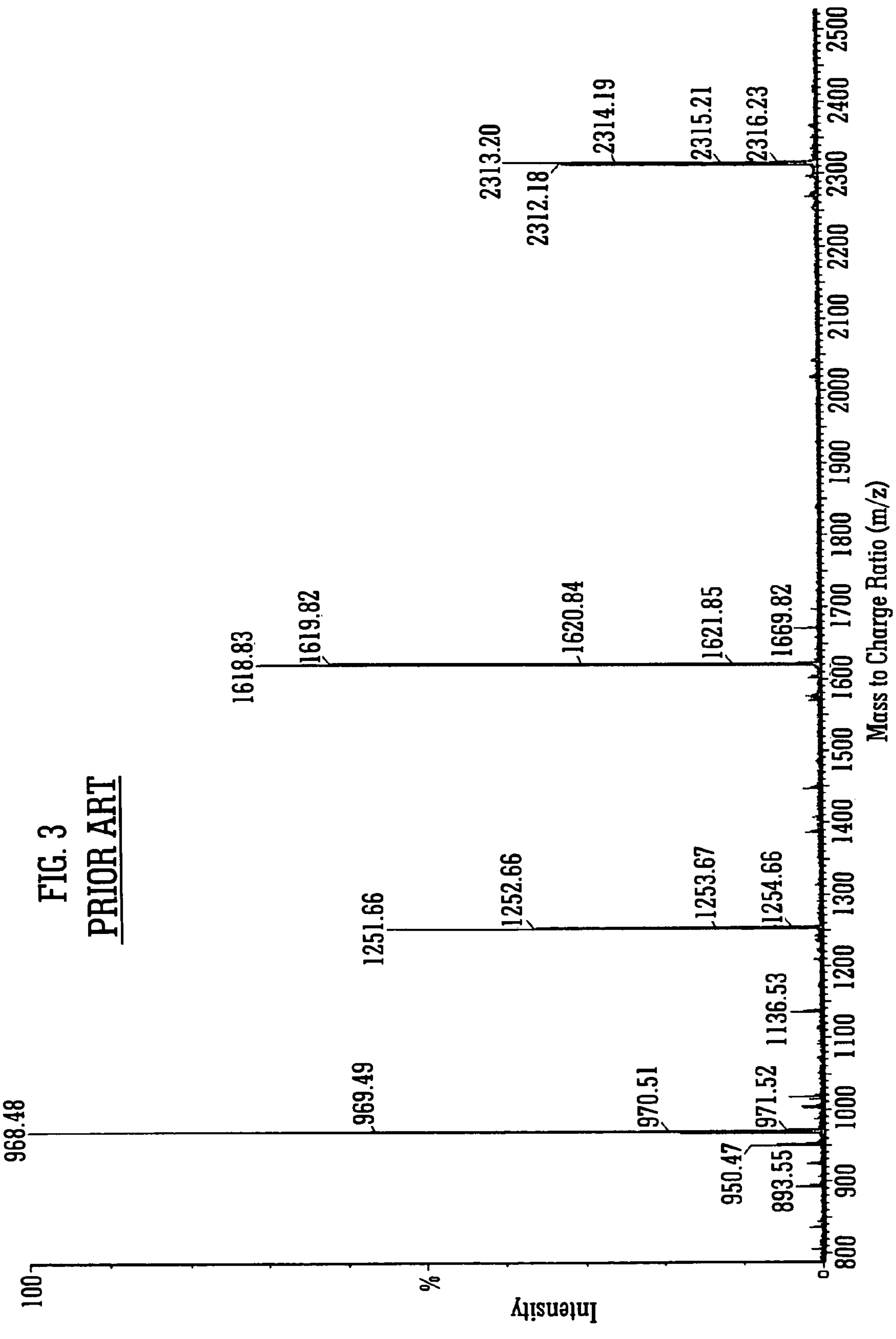
FIG. 3 PRIOR ART
FIG. 3 shows a parent ion mass spectrum of the parent peptide ions formed by tryptically digesting ADH as obtained using a conventional mass spectrometer.

FIG. 3 shows a calibrated parent ion mass spectrum of the various peptide ions resulting from the digestion of ADH. The parent ion mass spectrum was acquired and calibrated in a conventional manner.

Before the sample of ADH was analysed according to the preferred embodiment, the mass spectrometer was first calibrated. In order to calibrate the mass spectrometer for multiplexed PSD, 10 pmol of a single specific peptide ACTH (Adrenocorticotropic hormone, clip 18–39) was loaded. ACTH was used since the PSD fragmentation spectrum for ACTH was known from previous experimental work. A first PSD fragmentation mass spectrum of ACTH was then acquired and a second PSD fragmentation mass spectrum was acquired by decreasing the reflectron voltage by a minor decrement of approximately 4%.

Figures 4A, 4B:
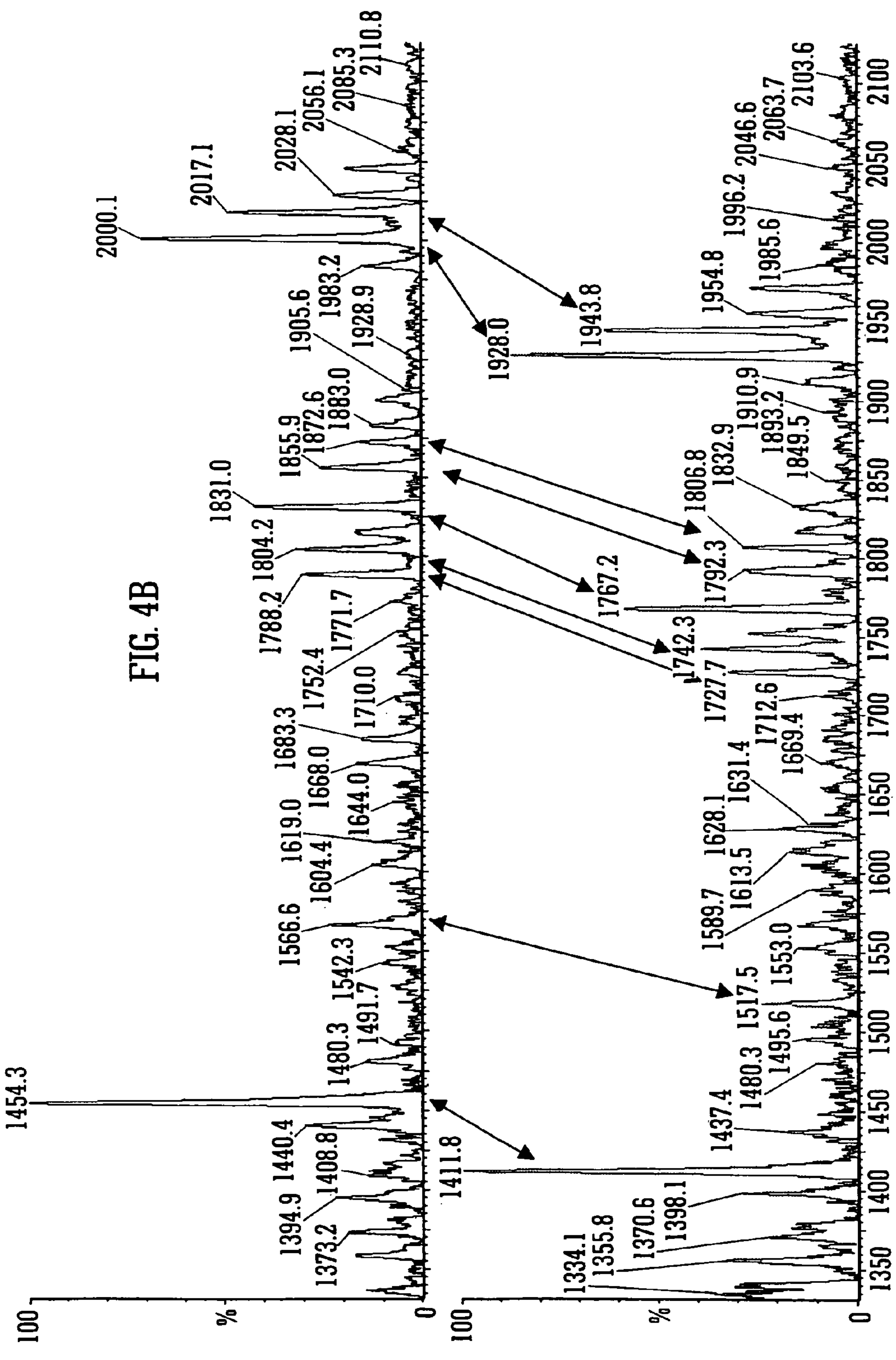
FIG. 4A shows a first uncalibrated PSD mass spectrum of the PSD fragments of the tryptic digest products of ACTH obtained at a first reflectron voltage and FIG. 4B shows a corresponding second uncalibrated PSD mass spectrum of the PSD fragments of the tryptic digest products of ACTH obtained when the reflectron was maintained at a second reflectron voltage which was 4% lower than the first reflectron voltage.

FIG. 4A shows a segment of an uncalibrated mass spectrum which was obtained when a (maximum) voltage of 13000 V was applied to the reflectron 7 of a mass spectrometer according to the preferred embodiment. The reflectron voltage, potential, electric field strength or gradient was such that only some PSD fragment ions were optimally reflected by the reflectron 7. FIG. 4B shows a segment of a corresponding uncalibrated mass spectrum acquired when the voltage, potential, electric field strength or gradient applied to the reflectron subsequently was reduced by a minor decrement of approximately 4% to a (maximum) voltage of 12500 V. The acceleration voltage for the data shown in FIGS. 4A and 4B was 14059 V. The portion or segment of the time of flight or mass spectral data shown in FIGS. 4A and 4B corresponds with fragment ions having energies such that they were optimally focussed by the reflectron 7.

The x-axis scale shown in FIGS. 4A and 4B is uncalibrated and represents arbitrary units proportional to the square root of the time of flight of the fragment ions. The times of flights $T_f, T_f'$ at the two different reflectron voltages (13000 V and 12500 V) for certain known fragment peaks or fragment ions were used to calculate the calibration coefficients a and b when the reflectron voltage was set at 13000 V and the calibration coefficients a and b' when the reflectron voltage was set at 12500 V. Therefore, instrument coefficients a, b, b' and Δb were determined for both reflectron voltage settings.

Once the mass spectrometer had been calibrated at the two different reflectron voltage, potential, electric field strength or gradient settings using the sample of ACTH, the sample of ADH could then be analysed to test whether the method of the preferred embodiment was able to identify the sample as being ADH. A sample of the digest products of ADH was loaded onto the sample or target plate 2 of the mass spectrometer according to the preferred embodiment and time of flight or mass spectral data was acquired under the same experimental conditions as were used for calibrating the mass spectrometer using the sample of ACTH. Two resulting uncalibrated mass spectra relating to the analysis of the ADH sample at reflectron voltages of 13000 V and 12500 V are shown in FIGS. 5A and 5B respectively.

Figures 5A, 5B:
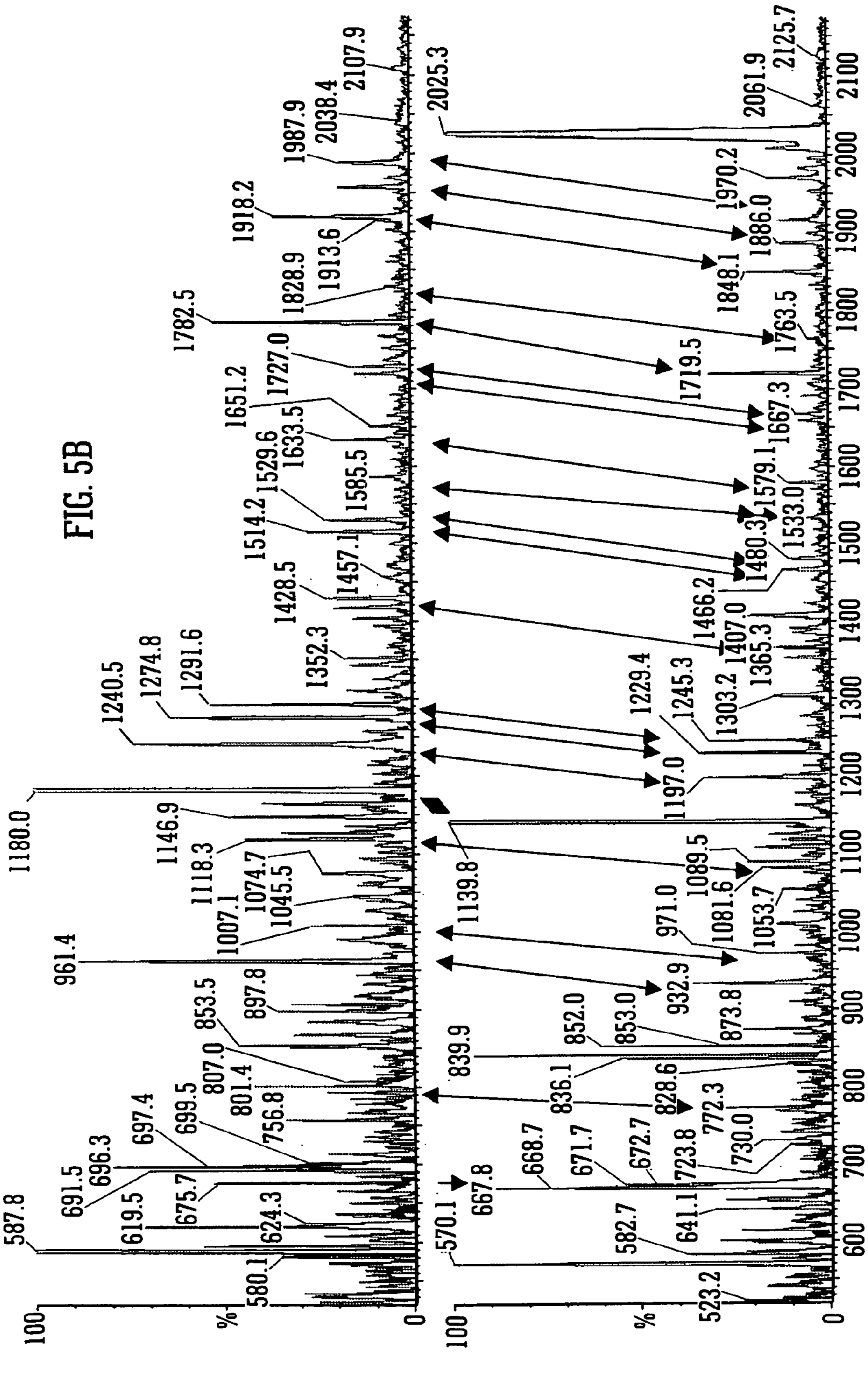
FIG. 5A shows an uncalibrated PSD spectrum of the PSD fragments of the tryptic digest products of ADH obtained at a first reflectron voltage and FIG. 5B shows a corresponding second uncalibrated PSD mass spectrum of the PSD fragments of the tryptic digest products of ADH obtained when the reflectron was maintained at a second reflectron voltage which was 4% lower than the first reflectron voltage.

The x-axis scale in FIGS. 5A and 5B is uncalibrated and simply represents arbitrary units proportional to the square root of the time of flight of the fragment ions. The times of flight $T_f, T_f'$ and therefore the value of $\Delta T_f$ for the same species fragment peaks or fragment ions were determined after first determining, identifying or correlating matching fragment peaks or corresponding fragment ions in the two mass spectra. Some of the peaks which were determined to represent or correspond with the same species of fragment ion are shown linked with arrows in FIGS. 5A and 5B. The mass to charge ratio of the fragment ions and the mass to charge ratio of the corresponding parent ions were then calculated for each observed fragment ion.

The process of recognising peaks or fragment ions as corresponding to or relating to the same species of fragment ion in the two different mass spectra (which were obtained at slightly different ion mirror reflectron voltages or relative potentials) may be carried out by visual inspection or more preferably by automatic determination.

If the ion mirror or reflectron voltage, relative potential, potential, electric field strength or gradient is decreased by a minor decrement or step of e.g. 4–5% then it is known that fragment ions having a certain mass to charge ratio will now spend longer in the ion mirror 7 or reflectron. Accordingly, the observed mass peaks corresponding to the fragment ions will all appear to be shifted in the same direction i.e. to a longer flight time. Peaks can also or additionally be recognised or matched as relating to the same species of fragment ion in the two different mass spectra on the basis of similarities in the height and/or width of the observed mass peaks in the two mass spectra. According to a particularly preferred embodiment the same species fragment ions can be recognised in the two mass spectra by comparing or correlating the pattern of isotope peaks in the two mass spectra.

The accuracy of the mass to charge ratios of predicted parent ions as determined solely from the PSD (i.e. time of flight or mass spectral) fragment ion data relating to the ADH sample was determined to be +/−1% if not better as will be discussed in more detail below in relation to the results shown in FIG. 6. Such an error window is comparable to the parent ion resolution obtained using a conventional mass spectrometer with an ion gate. However, the comparable level of accuracy was advantageously obtained using a mass spectrometer without an ion gate.

According to the preferred embodiment, for each fragment peak or fragment ion the mass to charge ratio of its corresponding parent ion was predicted. Preferably, the most intense peak or parent ion experimentally observed in a corresponding conventionally obtained parent (or precursor) ion mass spectrum located within, for example, an error window of 1% or 2% about the predicted parent ion mass to charge ratio may be assumed to correspond with the predicted parent ion. The mass to charge ratio of the parent ion as determined to correspond to the predicted parent ion and as determined experimentally from the parent ion mass spectrum may then be assumed as being the most accurate value of mass to charge ratio of the parent ion. The accurately experimentally determined parent ion mass to charge ratio may then be taken as being particularly accurate and can then be used or fed back into the simultaneous equations above to determine more accurately the mass to charge ratio of the observed fragment ion. Mass measurement accuracy of the fragment ions according to this approach is at least as accurate if not more accurate than the accuracy possible using a conventional mass spectrometer. Typical errors in the determination of the mass of fragment ions are less than 1 Dalton, preferably less than 0.5 Daltons.

According to the preferred embodiment data from a parent ion mass spectrum may be used to recognise mass peaks which correspond with or relate to the same species of fragment ion in two mass spectra obtained at slightly different ion mirror or reflectron voltage or relative potential settings. A parent ion mass spectrum may, for example, be analysed so as to provide a list of known parent ion mass to charge ratios. The experimentally determined parent ion mass to charge ratios may then each be used in the above simultaneous equations to calculate some or all theoretically possible mass to charge ratios which each fragment ion observed in a first mass spectrum obtained at a first ion mirror or reflectron voltage or relative potential would have based upon the determined time of flight of the particular fragment ion. Similarly, each experimentally determined parent ion mass to charge ratio may be used to calculate some or all theoretically possible mass to charge ratios which each fragment ion observed in a second mass spectrum obtained at a second ion mirror or reflectron voltage or relative potential would have based upon the determined time of flight of the particular fragment ion. Accordingly, for each observed fragment ion a whole series of theoretically possible candidate fragment ion mass to charge ratios may be calculated. The number of theoretically possible candidate fragment ion mass to charge ratios preferably corresponds with the number of observed parent ions. By comparing the list of theoretically possible candidate fragment ion mass to charge ratios for both mass spectra it is then possible to look for theoretically possible fragment ion mass to charge ratios in each mass spectra which match each other to within a specified mass to charge ratio window compatible with the expected accuracy of the mass to charge ratio measurement. In this way the recognition of the same species of fragment ion in two mass spectra obtained at slightly different ion mirror or reflectron voltages or relative potentials can be more easily automated.

In order to illustrate the preferred process of recognising that fragment ion mass peaks in two mass spectra obtained at slightly different ion mirror or reflectron voltages or relative potentials correspond with the same species fragment ions it may be assumed that each fragment ion observed in the mass spectra resulting from the PSD of peptide ions derived from ADH as shown in FIGS. 5A and 5B originates from one of the four most intense parent peptide ions observed in the parent peptide ion mass spectrum of the tryptic digest products of ADH protein as shown in FIG. 3. By applying the above simultaneous equations, four different tentative fragment ion mass to charge ratios may be suggested for each observed fragment ion in the mass spectra shown in FIGS. 5A and 5B. However, only one of the four tentative fragment ion mass to charge ratios will actually be correct.

According to the preferred embodiment matching predicted fragment ion mass to charge ratios to within a specified tolerance (e.g. within +/−1 dalton) may be sought for the same candidate parent ion. The fragment ion mass to charge which is the closest match for the same parent ion indicates the correct match.

In some instances, where for example there are numerous different parent ions, it may be possible for two unrelated fragment ions to appear to relate (wrongly) to apparently the same parent ion. However, such potentially incorrect assignments can preferably be avoided by, for example, also comparing the peak intensities and/or the peak shapes or profiles from the two fragmentation mass spectra. Incorrect assignments may also be avoided by additionally or alternatively acquiring a third (or yet further) PSD mass spectrum corresponding to a second or further minor decrement or step of the ion mirror or reflectron voltage, relative potential, potential, electric field strength or gradient i.e. each major decrement in the ion mirror or reflectron voltage or relative potential may be interspersed with two or more minor decrements rather than just one as according to the preferred embodiment. The data from the third (or yet further) time of flight data or mass spectrum may then be processed in a similar manner and used to confirm, or otherwise, the results from the first two PSD mass spectra. Third (or yet further) time of flight data or mass spectral data set may also be used to resolve two fragment peaks if they happen to overlap in one of the mass spectra.

FIG. 6 illustrates three parent peptide ions and corresponding fragment ions which were observed from analysing the ADH peptide mixture in accordance with the preferred embodiment. The experimentally calculated mass of each fragment ion was compared against the theoretical (or text book) mass of the fragment ion. The theoretical (or text book) mass of the fragment ions were calculated from their known sequences. The parent and fragment ions were also matched against theoretically derived peptide fragment masses using MASCOT (RTM) database search software from Matrix Science Ltd, UK. ADH1_Yeast was identified unambiguously from the experimental PSD fragmentation data. A probability based Mowse score of 81 indicated that the fragmentation data submitted almost certainly originated from ADH since scores >32 indicate probable identification of a protein. The confident identification of the protein is attributed to the specificity of the fragmentation data. Identification of the protein by the method of peptide mass fingerprinting alone (i.e. submitting just the three parent ion masses) was not possible using MASCOT (RTM).

Figure 7:
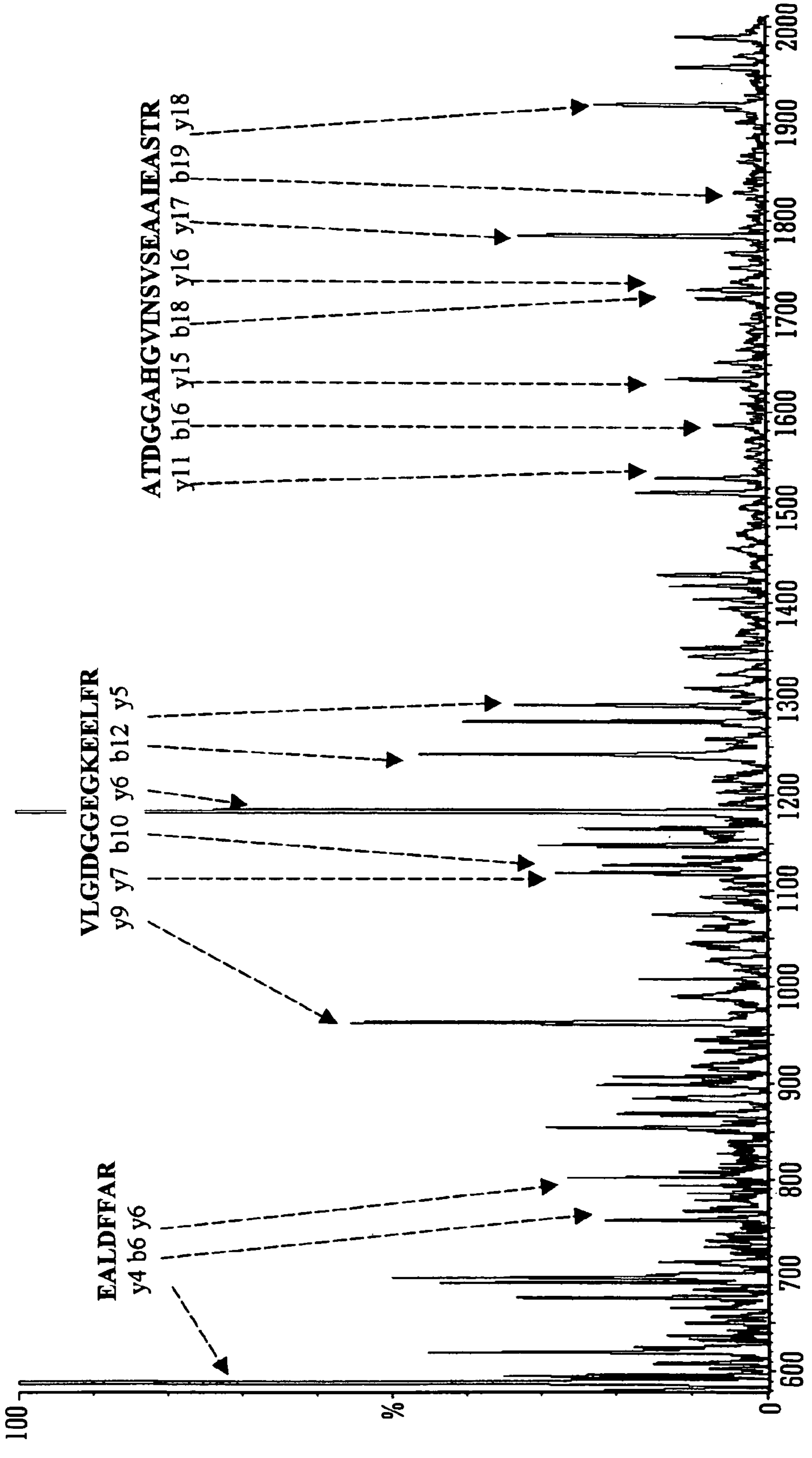
FIG. 7 shows an annotated uncalibrated mass spectrum showing various PSD fragment ions due to the fragmentation of three peptide ions derived from ADH as detailed in FIG. 6.

FIG. 7 shows an annotated but uncalibrated multiplexed PSD spectrum of ADH indicating different fragment ions formed due to PSD of the three parent peptide ions detailed in FIG. 6 and as matched using MASCOT (RTM). The x-axis scale is uncalibrated and simply represents arbitrary units proportional to the square root of the time of flight of the fragment ions. In this example the data was acquired by reducing the reflectron voltage by a minor decrement of 4%. Numerous different fragment ions were observed and identified. The reflectron voltage was progressively reduced by major decrements of 25% so that fragment ions having lower mass to charge ratios (i.e. less energetic fragment ions) were progressively optimally focused by the ion mirror 7 or reflectron.

A mixture of two peptides Angiotensin (MH+1296.7) and Substance-P (MH+1347.7) having fairly similar mass to charge ratios was also analysed according to the preferred embodiment. Both peptides were similarly uniquely identified in an unambiguous manner by entering the PSD fragmentation data into MASCOT (RTM).

Another experiment was performed with a tryptic digest of what was initially believed to be the protein ADH1. The resulting mass spectra showed an intense peptide peak at (MH+2477.1) when a parent ion mass spectrum of the sample was obtained. However, the to be expected parent ion spectrum for ADH1 is well known (see FIG. 3) and it is apparent from FIG. 3 that no parent ions having a mass to charge ratio of 2477.1 should be observed if the sample relates to the digest products of ADH1. The sample could not therefore be attributed to a tryptic digest of ADH1. After further analysis using a mass spectrometer according to the preferred embodiment, the resulting PSD fragmentation data was used to unambiguously identify the tryptic digest products as relating to the protein ADH2. ADH2 is similar to ADH1 except for a slight amino acid difference in part of the protein sequence. Conventional MALDI MS/MS experiments were then performed using a mass filter to select specific parent ions which were then fragmented to provide MS/MS mass spectral data. These experiments confirmed that the sample was ADH2 and not ADH1 as initially believed.

Further experimental data will now be reported which highlights the power of the preferred embodiment to uniquely identify a sample with minimal sample consumption. Six segments of Multiplexed PSD fragmentation data were acquired from 5 pmol of a tryptic digest of ADH. The PSD fragmentation data was then entered into a peak matching and parent ion assignment algorithm. A list of parent ions obtained from a parent ion scan was also obtained. A fragmentation ion peak list was produced which was then searched against a database using MASCOT (RTM) Ion Search (Matrix Science). MASCOT (RTM) correctly identified ADH with a probability based Mowse score of 190 which indicates an extremely high (i.e. unambiguous) certainty.

Figures 8, 9:
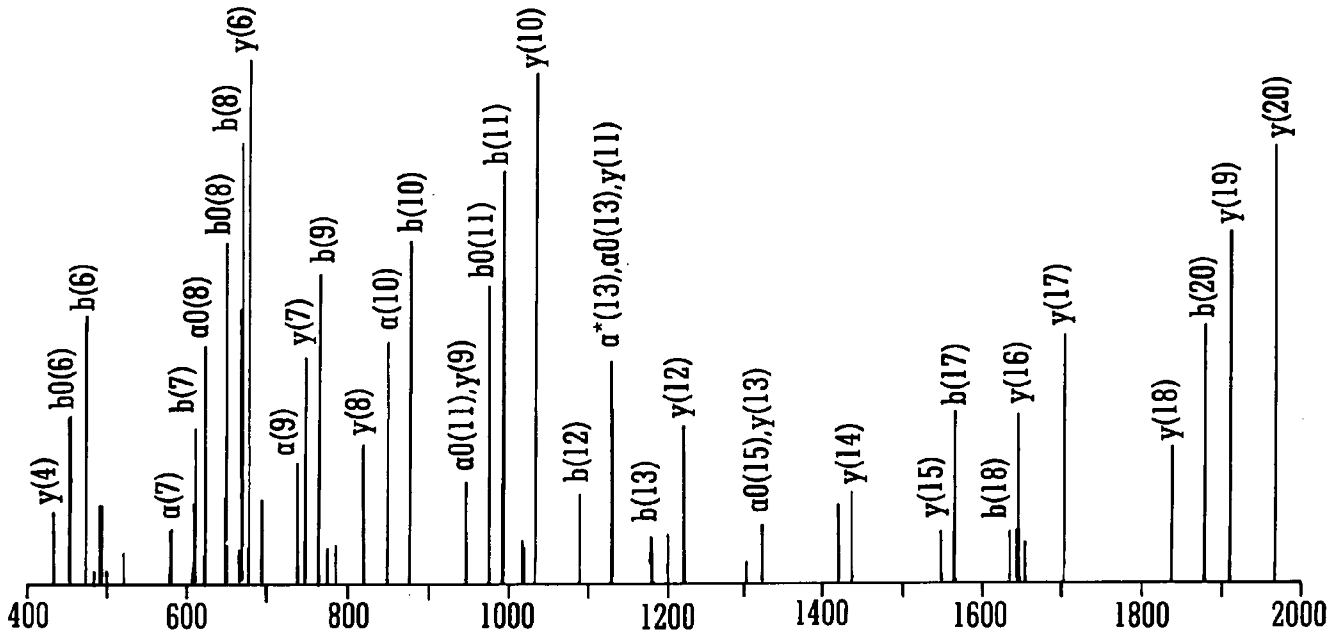
FIG. 8 shows five parent peptide ions obtained from a tryptic digest of ADH which were then correctly identified according to the preferred embodiment.
FIG. 9 shows experimental MS/MS or fragmentation mass spectral data obtained according to the preferred embodiment relating to the fragmentation of a parent peptide ion of ADH which had a nominal mass of 2312 Da.

In obtaining this match, MASCOT (RTM) correctly identified five parent peptides from ADH, all with top ranking i.e. they were all independently the best match to the data in the database. These five parent peptides are shown in FIG. 8. It is to be noted that three of these five parent peptide ions are shown and discussed above in relation to FIG. 6.

To further demonstrate the quality of data obtainable using the preferred multiplexed technique, fragmentation data was obtained for the parent peptide ion having a nominal mass of 2312 Da and the sequence ATDGGAHGVINVSVSEAAIEASTR. The resulting fragmentation data as matched by MASCOT (RTM) is shown in FIG. 9.

An advantageous feature of the preferred multiplexed technique is that it preferably filters a substantial amount of noise out from fragmentation mass spectra. The reduction in noise is due to the fact that a particular fragment ion must be observed in the correct place in two related fragmentation mass spectra and hence it will be apparent that there is a low statistical likelihood of noise peaks coinciding in this manner. Consequently, as can be seen from the fragmentation data shown in FIG. 9, the ratio of correctly identified peaks to the total number of observed peaks submitted is very high.

In this particular experiment only six segments of PSD fragmentation data were recorded i.e. the reflectron voltage was stepped down in six major decrements interspersed with six minor decrements. Each time the reflectron voltage was stepped down, PSD data was acquired. According to other embodiments 12 or more segments of PSD fragmentation data may be acquired (i.e. the reflectron voltage may be stepped down in twelve major decrements interspersed with twelve minor decrements) in order to obtain fragmentation mass spectral data across the whole of a typical mass range of interest. Nonetheless, six segments proved sufficient to obtain coverage across approximately 70% of the mass range of interest and was easily sufficient to categorically identify the sample as relating to ADH. In order to illustrate this further, FIG. 10 shows all the fragments which may theoretically result from the fragmentation of the parent peptide derived from ADH having a nominal mass of 2312 Daltons. FIG. 10 also shows in highlight those theoretical fragments which were matched exactly to experimentally observed fragment ions. As can be seen 16 out of the 23 possible y-series fragment ions were exactly matched. A significant number of the b-series fragment ions were also matched. The ability to be able to match so many of the fragment ions to the theoretical data illustrates that proteins can be identified to a very high level of confidence according to the preferred embodiment.

The peak matching and parent assignment algorithm which is used according to the preferred embodiment preferably iterates through each of the peaks in the fragment ion spectrum obtained when the ion mirror or reflectron voltage or relative potential was reduced by a minor decrement and then attempts to match these peaks to peaks in the fragment ion spectrum obtained when the ion mirror or reflectron voltage or relative potential was at a slightly higher voltage or relative potential i.e. the ion mirror or reflectron voltage or relative potential prior to the reduction by a minor decrement. Alternatively, the preferred algorithm may iterate through each of the peaks in the fragment ion spectrum obtained when the ion mirror or reflectron voltage or relative potential was reduced by a major decrement and then attempt to match these peaks to peaks in the fragment ion spectrum obtained when the ion mirror or reflectron voltage or relative potential was reduced by a minor decrement i.e. the ion mirror or reflectron voltage or relative potential prior to the reduction by a major decrement. The algorithm then assigns a parent ion to each pair of matched peaks, for example, as described below.

Considering a single fragment ion corresponding to a peak from a fragment ion spectrum obtained when the ion mirror or reflectron voltage or relative potential was reduced by a minor decrement, for at least some of the parent ions obtained from a parent ion scan an estimate may be made of the time of flight of the corresponding fragment ion in a fragment ion spectrum obtained when the ion mirror or reflectron voltage or relative potential was slightly higher. Hence, if there are ten parent ions then ten estimates may be made for the time of flight of the corresponding fragment ion in the corresponding fragment ion spectrum obtained when the ion mirror or reflectron voltage or relative potential was at a slightly higher voltage or relative potential. These ten estimated values may then, for example, be compared with the actual times of flight of fragment ions measured when the ion mirror or reflectron voltage or relative potential was at a slightly higher voltage or relative potential. Any one of these fragment ions that is found to be within a predetermined tolerance (for example of the order of +/−150 ppm) of the ten estimates may then preferably be considered as a potentially correct match. It is possible that several potentially correct matches may be found and hence further criteria may be used to determine which of the potential matches is correct. According to an embodiment, the peak from a fragment ion spectrum obtained when the ion mirror or reflectron voltage or relative potential was reduced by a minor decrement may be matched to the most intense potentially matching peak from a fragment ion spectrum obtained when the ion mirror or reflectron voltage or relative potential was at a slightly higher voltage or relative potential, although other methods of determining correct matches may be used.

It is possible that several peaks from a fragment ion spectrum obtained when the ion mirror or reflectron voltage or relative potential was reduced by a minor decrement may all be matched to the same single peak from a fragment ion spectrum obtained when the ion mirror or reflectron voltage or relative potential was at a slightly higher voltage or relative potential. Although this may, on occasion, be correct since two peaks in a fragment ion spectrum could overlap (i.e. they may not be able to be resolved from each other in one of the spectrums) it is more likely to be the exception rather than the rule. In order to avoid such multiple matches (false positives) the process of matching peaks may further require matching a peak from a fragment ion spectrum obtained when the ion mirror or reflectron voltage or relative potential was at a slightly higher voltage or relative potential to a peak from a fragment ion spectrum obtained when the ion mirror or reflectron voltage or relative potential was reduced by a minor decrement using the same method of matching as described above. In this embodiment, the pair of peaks from the two fragment ion spectra are determined to be correctly matched only if a peak from a fragment ion obtained when the ion mirror or reflectron voltage or relative potential was at a slightly higher voltage or relative potential is matched to the peak from the fragment ion obtained when the ion mirror or reflectron voltage or relative potential was reduced by a minor decrement and vice versa.

The matched pair of fragment ions may then be used to make an estimate of the parent ion from which they originated. Any experimentally observed parent ion within a predetermined tolerance (for example, +/−1.5% of the predicted parent mass) may be considered as being a potential match. In a similar manner to before, the matched pair of fragment ions may be matched to the most intense of the potentially matching parent ions. Once this has been completed, the mass to charge ratio of the parent ion which has been matched to the pair of fragment ion peaks may be used to calibrate the mass to charge ratios of the two matched fragment ions peaks to give two preferably slightly different measurements of the mass to charge ratio of the same fragment ion. The average of the two mass to charge ratios of the two peaks and their respective intensities may then be determined.

Monoisotopic mass is preferably measured for the experimentally observed parent ions. However, according to less preferred embodiments where the resolution of PSD fragmentation data is relatively low, then only the average mass to charge ratio for PSD fragment ions may be measured. The majority of database search engines including MASCOT (RTM) require either average mass for both parent and fragment masses or monoisotopic mass for both parent and fragment masses i.e. they do not allow monoisotopic mass to be used for parent ions whilst average mass is used for fragment ions. Accordingly, where necessary preferably a function may be applied to an average mass in order to convert it into monoisotopic mass. This function may be obtained empirically by plotting monoisotopic mass as a function of average mass for a number of common peptides. Different classes of compounds (e.g. polymers, sugars etc) may require different functions to be applied due to their particular isotope composition.

Various further optimisations may be made to further improve the speed of the preferred method but which do not directly affect the matching process. For example, during the matching process preferably a peak from a fragment ion spectrum obtained when the ion mirror or reflectron voltage or relative potential was reduced by a minor decrement is only attempted to be matched to peaks from a fragment ion spectrum obtained when the ion mirror or reflectron voltage or relative potential was at a slightly higher voltage or relative potential which have smaller estimated masses or times of flight (as this is an intrinsic property of the multiplexed technique). This is preferable as the same species of fragment ion will have a shorter time of flight when the ion mirror or reflectron voltage, relative potential, potential, electric field strength or gradient is increased. Accordingly, the same species of fragment ion will be detected at a shorter time of flight in the fragment ion spectrum obtained when the ion mirror or reflectron voltage or relative potential was at a slightly higher voltage or relative potential as compared to the fragment ion spectrum obtained when the ion mirror or reflectron voltage or relative potential was reduced by a minor decrement. Similarly, only peaks from fragment ion spectra which correspond to fragment ions having mass to charge ratios within the optimally focussed region of the ion mirror 7 or reflectron may be considered in the matching process.

According to various embodiments, once several potential matches between the peaks from the fragment ion spectra and the parent ions have been obtained the method to determine which potential match is the correct match may include: (i) matching a peak from one fragment ion spectrum to the most intense peak from another fragment ion spectrum and then matching one of these matched peaks to the most intense parent ion peak; (ii) matching a peak from one fragment ion spectrum to the most intense parent ion peak and then matching one of these peaks to the most intense fragment ion peak from another fragment ion spectrum; (iii) matching a peak from a fragment ion spectrum to the closest estimate of that peak, each estimate of that peak being obtained from the corresponding peak on another fragment ion spectrum and a different parent ion peak; (iv) matching a peak from a fragment ion spectrum to the most intense peak of another fragment ion spectrum and then matching one of these peaks to the closest match of the parent ion peaks; and (v) matching a peak from a fragment ion spectrum to the most intense parent ion peak and then matching to the closest match of the fragment ion peaks from another fragment ion spectrum.

Embodiments are also contemplated using different instrument geometries. For example, a non-linear electric field reflectron may be used according to a less preferred embodiment.

According to the preferred embodiment the ion mirror or reflectron voltage or relative potential is progressively reduced in use. However, this does not have to be the case and other embodiments are contemplated wherein the ion mirror or reflectron voltage, relative potential, potential, electric field strength or gradient is initially set relatively low and is then progressively increased such that increasingly energetic fragment ions are optimally focussed and reflected by the ion mirror 7 or reflectron.

Further less preferred embodiments are contemplated wherein the ion mirror or reflectron voltage, relative potential, potential, electric field strength or gradient is decreased and/or increased in another manner (which may be linear or non-linear) or in a substantially random manner. It is apparent therefore that fragmentation data over some or all of the mass or mass to charge ratio range of interest should be obtained preferably by altering the maximum voltage or the maximum relative potential at which the ion mirror 7 or reflectron is maintained in a number of stages so that fragment ions having different energies are all optimally focussed in turn. The usable data can then be used to form one or more composite mass spectra. However, the precise order in which segments of usable data are obtained can vary.

Although the present invention has been described with reference to preferred embodiments and other arrangements, it will be understood by those skilled in the art that various changes in form and detail may be made without departing from the scope of the invention as set forth in the accompanying claims.

The invention claimed is:

1. A method of mass spectrometry comprising:
providing a Time of Flight mass analyser comprising an ion mirror;
maintaining said ion mirror at a first setting;
obtaining first time of flight or mass spectral data when said ion mirror is at said first setting;
maintaining said ion mirror at a second different setting;
obtaining second time of flight or mass spectral data when said ion mirror is at said second setting;
determining a first time of flight of first fragment ions having a certain mass or mass to charge ratio when said ion mirror is at said first setting;
determining a second different time of flight of first fragment ions having said same certain mass or mass to charge ratio when said ion mirror is at said second setting; and
determining from said first and second times of flight either the mass or mass to charge ratio of parent ions which fragmented to produce said first fragment ions and/or the mass or mass to charge ratio of said first fragment ions; and
obtaining a parent ion mass spectrum.

2. A method as claimed in claim 1, wherein said ion mirror comprises a reflectron.

3. A method as claimed in claim 2, wherein said reflectron comprises a linear electric field reflectron or a non-linear electric field reflectron.

4. A method as claimed in claim 1, further comprising providing an ion source and a drift or flight region upstream of said ion mirror, wherein when said ion mirror is at said first setting a first potential difference is maintained between said ion source and said drift or flight region and when said ion mirror is at said second setting a second potential difference is maintained between said ion source and said drift or flight region.

5. A method as claimed in claim 4, wherein said first potential difference is substantially the same as said second potential difference.

6. A method as claimed in claim 4, wherein said first potential difference is substantially different to said second potential difference.

7. A method as claimed in claim 6, wherein the difference between said first potential difference and said second potential difference is p % of said first or second potential difference, wherein p falls within a range selected from the group consisting of: (i) <1; (ii) 1–2; (iii) 2–3; (iv) 3–4; (v) 4–5; (vi) 5–6; (vii) 6–7; (viii) 7–8; (ix) 8–9; (x) 9–10; (xi) 10–15; (xii) 15–20; (xiii) 20–25; (xiv) 25–30; (xv) 30–35; (xvi) 35–40; (xvii) 40–45; (xviii) 45–50; and (xix) >50.

8. A method as claimed in claim 6, wherein the difference between said first potential difference and said second potential difference is selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

9. A method as claimed in claim 6, wherein said first potential difference and/or said second potential difference fall within a range selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

10. A method as claimed in claim 1, wherein when said ion mirror is at said first setting a first electric field strength or gradient is maintained along at least 10%, 20%, 30%, 40%, 50%, 60%, 70%, 80%, 90%, 95% or 100% of the length of said ion mirror and when said ion mirror is at said second setting a second electric field strength or gradient is maintained along at least 10%, 20%, 30%, 40%, 50%, 60%, 70%, 80%, 90%, 95% or 100% of the length of said ion mirror.

11. A method as claimed in claim 10, wherein said first electric field strength or gradient is substantially the same as said second electric field strength or gradient.

12. A method as claimed in claim 10, wherein said first electric field strength or gradient is substantially different to said second electric field strength or gradient.

13. A method as claimed in claim 12, wherein the difference between said first electric field strength or gradient and said second electric field strength or gradient is q % of said first or second electric field strength or gradient, wherein q falls within a range selected from the group consisting of: (i) <1; (ii) 1–2; (iii) 2–3; (iv) 3–4; (v) 4–5; (vi) 5–6; (vii) 6–7; (viii) 7–8; (ix) 8–9; (x) 9–10; (xi) 10–15; (xii) 15–20; (xiii) 20–25; (xiv) 25–30; (xv) 30–35; (xvi) 35–40; (xvii) 40–45; (xviii) 45–50; and (xix) >50.

14. A method as claimed in claim 12, wherein the difference between said first electric field strength or gradient and said second electric field strength or gradient is selected from the group consisting of: (i) <0.01 kV/cm; (ii) 0.01–0.1 kV/cm; (iii) 0.1–0.5 kV/cm; (iv) 0.5–1 kV/cm; (v) 1–2 kV/cm; (vi) 2–3 kV/cm; (vii) 3–4 kV/cm; (viii) 4–5 kV/cm; (ix) 5–6 kV/cm; (x) 6–7 kV/cm; (xi) 7–8 kV/cm; (xii) 8–9 kV/cm; (xiii) 9–10 kV/cm; (xiv) 10–11 kV/cm; (xv) 11–12 kV/cm; (xvi) 12–13 kV/cm; (xvii) 13–14 kV/cm; (xviii) 14–15 kV/cm; (xix) 15–16 kV/cm; (xx) 16–17 kV/cm; (xxi) 17–18 kV/cm; (xxii) 18–19 kV/cm; (xxiii) 19–20 kV/cm; (xxiv) 20–21 kV/cm; (xxv) 21–22 kV/cm; (xxvi) 22–23 kV/cm; (xxvii) 23–24 kV/cm; (xxviii) 24–25 kV/cm; (xxix) 25–26 kV/cm; (xxx) 26–27 kV/cm; (xxxi) 27–28 kV/cm; (xxxii) 28–29 kV/cm; (xxxiii) 29–30 kV/cm; and (xxxiv) >30 kV/cm.

15. A method as claimed in claim 12, wherein said first electric field strength or gradient and/or said second electric field strength or gradient fall within a range selected from the group consisting of: (i) <0.01 kV/cm; (ii) 0.01–0.1 kV/cm; (iii) 0.1–0.5 kV/cm; (iv) 0.5–1 kV/cm; (v) 1–2 kV/cm; (vi) 2–3 kV/cm; (vii) 3–4 kV/cm; (viii) 4–5 kV/cm; (ix) 5–6 kV/cm; (x) 6–7 kV/cm; (xi) 7–8 kV/cm; (xii) 8–9 kV/cm; (xiii) 9–10 kV/cm; (xiv) 10–11 kV/cm; (xv) 11–12 kV/cm; (xvi) 12–13 kV/cm; (xvii) 13–14 kV/cm; (xviii) 14–15 kV/cm; (xix) 15–16 kV/cm; (xx) 16–17 kV/cm; (xxi) 17–18 kV/cm; (xxii) 18–19 kV/cm; (xxiii) 19–20 kV/cm; (xxiv) 20–21 kV/cm; (xxv) 21–22 kV/cm; (xxvi) 22–23 kV/cm; (xxvii) 23–24 kV/cm; (xxviii) 24–25 kV/cm; (xxix) 25–26 kV/cm; (xxx) 26–27 kV/cm; (xxxi) 27–28 kV/cm; (xxxii) 28–29 kV/cm; (xxxiii) 29–30 kV/cm; and (xxxiv) >30 kV/cm.

16. A method as claimed in claim 1, wherein when said ion mirror is at said first setting said ion mirror is maintained at a first voltage and when said ion mirror is at said second setting said ion mirror is maintained at a second voltage.

17. A method as claimed in claim 16, wherein said first voltage is substantially the same as said second voltage.

18. A method as claimed in claim 16, wherein said first voltage is substantially different to said second voltage.

19. A method as claimed in claim 18, wherein the difference between said first voltage and said second voltage is r % of said first or second voltage, wherein r falls within a range selected from the group consisting of: (i) <1; (ii) 1–2; (iii) 2–3; (iv) 3–4; (v) 4–5; (vi) 5–6; (vii) 6–7; (viii) 7–8; (ix) 8–9; (x) 9–10; (xi) 10–15; (xii) 15–20; (xiii) 20–25; (xiv) 25–30; (xv) 30–35; (xvi) 35–40; (xvii) 40–45; (xviii) 45–50; and (xix) >50.

20. A method as claimed in claim 18, wherein the difference between said first voltage and said second voltage is selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

21. A method as claimed in claim 18, wherein said first voltage and/or said second voltage fall within a range selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

22. A method as claimed in claim 1, further comprising providing an ion source, wherein when said ion mirror is at said first setting said ion mirror is maintained at a first potential relative to the potential of said ion source and when said ion mirror is at said second setting said ion mirror is maintained at a second potential relative to the potential of said ion source.

23. A method as claimed in claim 22, wherein said first potential is substantially the same as said second potential.

24. A method as claimed in claim 22, wherein said first potential is substantially different from said second potential.

25. A method as claimed in claim 24, wherein the difference between said first potential and said second potential is s % of said first or second potential, wherein s falls within a range selected from the group consisting of: (i) <1; (ii) 1–2; (iii) 2–3; (iv) 3–4; (v) 4–5; (vi) 5–6; (vii) 6–7; (viii) 7–8; (ix) 8–9; (x) 9–10; (xi) 10–15; (xii) 15–20; (xiii) 20–25; (xiv) 25–30; (xv) 30–35; (xvi) 35–40; (xvii) 40–45; (xviii) 45–50; and (xix) >50.

26. A method as claimed in claim 24, wherein the potential difference between said first potential and the potential of said ion source and/or said second potential and the potential of said ion source falls within a range selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

27. A method as claimed in claim 24, wherein said first potential and/or said second potential fall within a range selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV;

(xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

28. A method as claimed in claim 1, further comprising providing an ion source selected from the group consisting of: (i) an Electrospray ("ESI") ion source; (ii) an Atmospheric Pressure Chemical Ionisation ("APCI") ion source; (iii) an Atmospheric Pressure Photo Ionisation ("APPI") ion source; (iv) a Laser Desorption Ionisation ("LDI") ion source; (v) an Inductively Coupled Plasma ("ICP") ion source; (vi) an Electron Impact ("EI") ion source; (vii) a Chemical Ionisation ("CI") ion source; (viii) a Field Ionisation ("FI") ion source; (ix) a Fast Atom Bombardment ("FAB") ion source; (x) a Liquid Secondary Ion Mass Spectrometry ("LSIMS") ion source; (xi) an Atmospheric Pressure Ionisation ("API") ion source; (xii) a Field Desorption ("FD") ion source; (xiii) a Matrix Assisted Laser Desorption Ionisation ("MALDI") ion source; and (xiv) a Desorption/Ionisation on Silicon ("DIOS") ion source.

29. A method as claimed in claim 1, further comprising providing a continuous ion source.

30. A method as claimed in claim 1, further comprising providing a pulsed ion source.

31. A method as claimed in claim 1, further comprising providing a drift or flight region upstream of said ion mirror, wherein when said ion mirror is at said first setting said ion mirror is maintained at a first potential relative to the potential of said drift or flight region and when said ion mirror is at said second setting said ion mirror is maintained at a second potential relative to the potential of said drift or flight region.

32. A method as claimed in claim 31, wherein said first potential is substantially the same as said second potential.

33. A method as claimed in claim 31, wherein said first potential is substantially different to said second potential.

34. A method as claimed in claim 33, wherein the difference between said first potential and said second potential is t % of said first or second potential, wherein t falls within a range selected from the group consisting of: (i) <1; (ii) 1–2; (iii) 2–3; (iv) 3–4; (v) 4–5; (vi) 5–6; (vii) 6–7; (viii) 7–8; (ix) 8–9; (x) 9–10; (xi) 10–15; (xii) 15–20; (xiii) 20–25; (xiv) 25–30; (xv) 30–35; (xvi) 35–40; (xvii) 40–45; (xviii) 45–50; and (xix) >50.

35. A method as claimed in claim 33, wherein the difference between said first potential and said second potential fall within a range selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

36. A method as claimed in claim 33, wherein said first potential and/or said second potential fall within a range selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

37. A method as claimed in claim 1, wherein when said ion mirror is at said first setting ions having a certain mass to charge ratio and/or a certain energy penetrate at least a first distance into said ion mirror and when said ion mirror is at said second setting ions having said certain mass to charge ratio and/or said certain energy penetrate at least a second different distance into said ion mirror.

38. A method as claimed in claim 37, wherein the difference between said first and second distance is u % of said first or second distance, wherein u falls within a range selected from the group consisting of: (i) <1; (ii) 1–2; (iii) 2–3; (iv) 3–4; (v) 4–5; (vi) 5–6; (vii) 6–7; (viii) 7–8; (ix) 8–9; (x) 9–10; (xi) 10–15; (xii) 15–20; (xiii) 20–25; (xiv) 25–30; (xv) 30–35; (xvi) 35–40; (xvii) 40–45; (xviii) 45–50; and (xix) >50.

39. A method as claimed in claim 1, wherein the steps of determining said first time of flight of said first fragment ions and said second time of flight of said first fragment ions comprises recognising, determining, identifying or locating first fragment ions in said first time of flight or mass spectral data and recognising, determining, identifying or locating corresponding first fragment ions in said second time of flight data.

40. A method as claimed in claim 39, wherein the step of recognising, determining, identifying or locating first fragment ions in said first time of flight or mass spectral data is made manually and/or automatically and wherein the step of recognising, determining, identifying or locating first fragment ions in said second time of flight or mass spectral data is made manually and/or automatically.

41. A method as claimed in claim 39, wherein the step of recognising, determining, identifying or locating first fragment ions in said first and/or said second time of flight or mass spectral data comprises comparing a pattern of isotope peaks in said first time of flight or mass spectral data with a pattern of isotope peaks in said second time of flight or mass spectral data.

42. A method as claimed in claim 41, wherein the step of comparing the pattern of isotope peaks comprises comparing the relative intensities of isotope peaks and/or the distribution of isotope peaks.

43. A method as claimed in claim 39, wherein the step of recognising, determining, identifying or locating first fragment ions in said first and/or said second time of flight or mass spectral data comprises comparing the intensity of ions in said first time of flight or mass spectral data with the intensity of ions in said second time of flight or mass spectral data.

44. A method as claimed in claim 39, wherein the step of recognising, determining, identifying or locating first fragment ions in said first and/or said second time of flight or mass spectral data comprises comparing the width of one or more mass spectral peaks in a first mass spectrum produced from said first time of flight or mass spectral data with the width of one or more mass spectral peaks in a second mass spectrum produced from said second time of flight or mass spectral data.

45. A mass spectrometer comprising:

a Matrix Assisted Laser Desorption Ionisation ("MALDI") ion source; and a Time of Flight mass analyser, said Time of Flight mass analyser comprising an ion mirror, wherein, in use, said ion mirror is maintained at a first setting at a first time and first time of flight or mass spectral data is obtained and said ion mirror is maintained at a second different setting at a second time and second time of flight or mass spectral data is obtained; and wherein said mass spectrometer determines in use:

(a) a first time of flight of first fragment ions having a certain mass or mass to charge ratio when said ion mirror is maintained at said first setting;

(b) a second different time of flight of first fragment ions having said same certain mass or mass to charge ration when said ion mirror is maintained at said second setting; and (c) the mass or mass to charge ration of parent ions which fragmented to produce said first fragment ions and/or the mass or mass to charge ratio of said first fragment ions from said first and second times of flight.

46. A method as claimed in claim 1, further comprising determining the mass or mass to charge ratio of one or more parent ions from said parent ion mass spectrum.

47. A method as claimed in claim 46, further comprising determining the time of flight of one or more fragment ions from said first time of flight or mass spectral data.

48. A method as claimed in claim 47, further comprising predicting the mass or mass to charge ratio which a first possible fragment ion would have based upon the mass or mass to charge ratio of a parent ion as determined from said parent ion mass spectrum and the time of flight of a fragment ion as determined from said first time of flight or mass spectral data.

49. A method as claimed in claim 47, further comprising predicting the masses or mass to charge ratios which first possible fragment ions would have based upon the mass or mass to charge ratio of one or more parent ions as determined from said parent ion mass spectrum and the time of flight of one or more fragment ions as determined from said first time of flight or mass spectral data.

50. A method as claimed in claim 46, further comprising determining the time of flight of one or more fragment ions from said second time of flight or mass spectral data.

51. A method as claimed in claim 50, further comprising predicting the mass or mass to charge ratio which a second possible fragment ion would have based upon the mass or mass to charge ratio of a parent ion as determined from said parent ion mass spectrum and the time of flight of a fragment ion as determined from said second time of flight or mass spectral data.

52. A method as claimed in claim 50, further comprising predicting the masses or mass to charge ratios which second possible fragment ions would have based upon the mass to charge ratio of one or more parent ions as determined from said parent ion mass spectrum and the time of flight of one or more fragment ions as determined from said second time of flight or mass spectral data.

53. A method as claimed in claim 51, further comprising comparing or correlating the predicted mass or mass to charge ratio of one or more first possible fragment ions with the predicted mass or mass to charge ratio of one or more second possible fragment ions.

54. A method as claimed in claim 53, further comprising recognising, determining or identifying fragment ions in said first time of flight or mass spectral data as relating to the same species of fragment ions in said second time of flight or mass spectral data if the predicted mass or mass to charge ratio of said one or more first possible fragment ions corresponds to within x % of the predicted mass or mass to charge ratio of said one or more second possible fragment ions.

55. A method as claimed in claim 54, wherein x falls within the range selected from the group consisting of: (i) <0.001; (ii) 0.001–0.01; (iii) 0.01–0.1; (iv) 0.1–0.5; (v) 0.5–1.0; (vi) 1.0–1.5; (vii) 1.5–2.0; (viii) 2–3; (ix) 3–4; (x) 4–5; and (xi) >5.

56. A method as claimed in claim 1, wherein said step of determining from said first and second times of flight the mass or mass to charge ratio of parent ions which fragmented to produce said first fragment ions comprises:

determining the mass to charge ratio of said parent ions which fragmented to produce said first fragment ions independently or without requiring knowledge of the mass or mass to charge ratio of said first fragment ions.

57. A method as claimed in claim 56, wherein said step of determining the mass or mass to charge ratio of said parent ions which fragmented to produce said first fragment ions independently or without requiring knowledge of the mass or mass to charge ratio of said first fragment ions comprises:

determining from a parent ion mass spectrum whether one or more parent ion mass peaks are observed within y % of the predicted mass or mass to charge ratio of said parent ions which were determined to have fragmented to produce said first fragment ions.

58. A method as claimed in claim 57, wherein y falls within the range selected from the group consisting of: (i) <0.001; (ii) 0.001–0.01; (iii) 0.01–0.1; (iv) 0.1–0.5; (v) 0.5–1.0; (vi) 1.0–1.5; (vii) 1.5–2.0; (viii) 2–3; (ix) 3–4; (x) 4–5; and (xi) >5.

59. A method as claimed in claim 57, wherein if one parent ion mass peak is observed within y % of the predicted mass or mass to charge ratio of said parent ions which were determined to have fragmented to produce said first fragment ions, then the mass or mass to charge ratio of said parent ion mass peak is taken to be a more accurate determination of the mass or mass to charge ratio of said parent ions which fragmented to produce said first fragment ions.

60. A method as claimed in claim 57, wherein if more than one parent ion mass peaks are observed within y % of the predicted mass or mass to charge ratio of said parent ions which were determined to have fragmented to produce said first fragment ions, then a determination is made as to which observed parent ion mass peak corresponds or relates to the most likely parent ion to have fragmented to produce said first fragment ions.

61. A method as claimed in claim 60, wherein a determination is made as to which observed parent ion mass peak corresponds or relates to the most likely parent ion to have fragmented to produce said first fragment ions by referring to third time of flight or mass spectral data obtained when said ion mirror was maintained at a third different setting.

62. A method as claimed in claim 60, wherein the mass or mass to charge ratio of the observed parent ion mass peak which corresponds or relates to the most likely parent ion to have fragmented to produce said first fragment ions is taken to be a more accurate determination of the mass or mass to charge ratio of said parent ions which fragmented to produce said first fragment ions.

63. A method as claimed in claim 59, wherein a more accurate determination of the mass or mass to charge ratio of said first fragment ions is made using said more accurate determination of the mass or mass to charge ratio of said parent ions.

64. A mass spectrometer comprising:

a Time of Flight mass analyser, said Time of Flight mass analyser comprising an ion mirror, wherein, in use, said ion mirror is maintained at a first setting at a first time and first time of flight or mass spectral data is obtained and said ion mirror is maintained at a second different setting at a second time and second time of flight or mass spectral data is obtained; and wherein said mass spectrometer determines in use:

(a) a first time of flight of first fragment ions having a certain mass or mass to charge ratio when said ion mirror is maintained at said first setting;

(b) a second different time of flight of first fragment ions having said same certain mass or mass to charge ratio when said ion mirror is maintained at said second setting; and (c) the mass or mass to charge ratio of parent ions which fragmented to produce said first fragment ions and/or the mass or mass to charge ratio of said first fragment ions from said first and second times of flight; and (d) a parent ion mass spectrum.

65. A mass spectrometer as claimed in claim 64, wherein said ion mirror comprises a reflectron.

66. A mass spectrometer as claimed in claim 65, wherein said reflectron comprises a linear electric field reflectron or a non-linear electric field reflectron.

67. A mass spectrometer as claimed in claim 64, further comprising an ion source and a drift or flight region upstream of said ion mirror, wherein, in use, when said ion mirror is at said first setting a first potential difference is maintained between said ion source and said drift or flight region and when said ion mirror is at said second setting a second potential difference is maintained between said ion source and said drift or flight region.

68. A mass spectrometer as claimed in claim 67, wherein, in use, said first potential difference is substantially the same as said second potential difference.

69. A mass spectrometer as claimed in claim 67, wherein, in use, said first potential difference is substantially different to said second potential difference.

70. A mass spectrometer as claimed in claim 69, wherein, in use, the difference between said first potential difference and said second potential difference is p % of said first or second potential difference, wherein p falls within a range selected from the group consisting of: (i) <1; (ii) 1–2; (iii) 2–3; (iv) 3–4; (v) 4–5; (vi) 5–6; (vii) 6–7; (viii) 7–8; (ix) 8–9; (x) 9–10; (xi) 10–15; (xii) 15–20; (xiii) 20–25; (xiv) 25–30; (xv) 30–35; (xvi) 35–40; (xvii) 40–45; (xviii) 45–50; and (xix) >50.

71. A mass spectrometer as claimed in claim 69, wherein, in use, the difference between said first potential difference and said second potential difference is selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

72. A mass spectrometer as claimed in claim 69, wherein, in use, said first potential difference and/or said second potential difference fall within a range selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

73. A mass spectrometer as claimed in claim 64, wherein, in use, when said ion mirror is at said first setting a first electric field strength is maintained along at least 10%, 20%, 30%, 40%, 50%, 60%, 70%, 80%, 90%, 95% or 100% of the length of said ion mirror and when said ion mirror is at said second setting a second electric field strength is maintained along at least 10%, 20%, 30%, 40%, 50%, 60%, 70%, 80%, 90%, 95% or 100% of the length of said ion mirror.

74. A mass spectrometer as claimed in claim 73, wherein, in use, said first electric field strength is substantially the same as said second electric field strength.

75. A mass spectrometer as claimed in claim 73, wherein, in use, said first electric field strength is substantially different to said second electric field strength.

76. A mass spectrometer as claimed in claim 75, wherein, in use, the difference between said first electric field strength and said second electric field strength is q % of said first or second electric field strength, wherein q falls within a range selected from the group consisting of: (i) <1; (ii) 1–2; (iii) 2–3; (iv) 3–4; (v) 4–5; (vi) 5–6; (vii) 6–7; (viii) 7–8; (ix) 8–9; (x) 9–10; (xi) 10–15; (xii) 15–20; (xiii) 20–25; (xiv) 25–30; (xv) 30–35; (xvi) 35–40; (xvii) 40–45; (xviii) 45–50; and (xix) >50.

77. A mass spectrometer as claimed in claim 75, wherein, in use, the difference between said first electric field strength and said second electric field strength is selected from the group consisting of: (i) <0.01 kV/cm; (ii) 0.01–0.1 kV/cm; (iii) 0.1–0.5 kV/cm; (iv) 0.5–1 kV/cm; (v) 1–2 kV/cm; (vi) 2–3 kV/cm; (vii) 3–4 kV/cm; (viii) 4–5 kV/cm; (ix) 5–6 kV/cm; (x) 6–7 kV/cm; (xi) 7–8 kV/cm; (xii) 8–9 kV/cm; (xiii) 9–10 kV/cm; (xiv) 10–11 kV/cm; (xv) 11–12 kV/cm; (xvi) 12–13 kV/cm; (xvii) 13–14 kV/cm; (xviii) 14–15 kV/cm; (xix) 15–16 kV/cm; (xx) 16–17 kV/cm; (xxi) 17–18 kV/cm; (xxii) 18–19 kV/cm; (xxiii) 19–20 kV/cm; (xxiv) 20–21 kV/cm; (xxv) 21–22 kV/cm; (xxvi) 22–23 kV/cm; (xxvii) 23–24 kV/cm; (xxviii) 24–25 kV/cm; (xxix) 25–26 kV/cm; (xxx) 26–27 kV/cm; (xxxi) 27–28 kV/cm; (xxxii) 28–29 kV/cm; (xxxiii) 29–30 kV/cm; and (xxxiv) >30 kV/cm.

78. A mass spectrometer as claimed in claim 75, wherein, in use, said first electric field strength and/or said second electric field strength fall within a range selected from the group consisting of: (i) <0.01 kV/cm; (ii) 0.01–0.1 kV/cm; (iii) 0.1–0.5 kV/cm; (iv) 0.5–1 kV/cm; (v) 1–2 kV/cm; (vi) 2–3 kV/cm; (vii) 3–4 kV/cm; (viii) 4–5 kV/cm; (ix) 5–6 kV/cm; (x) 6–7 kV/cm; (xi) 7–8 kV/cm; (xii) 8–9 kV/cm; (xiii) 9–10 kV/cm; (xiv) 10–11 kV/cm; (xv) 11–12 kV/cm; (xvi) 12–13 kV/cm; (xvii) 13–14 kV/cm; (xviii) 14–15 kV/cm; (xix) 15–16 kV/cm; (xx) 16–17 kV/cm; (xxi) 17–18 kV/cm; (xxii) 18–19 kV/cm; (xxiii) 19–20 kV/cm; (xxiv) 20–21 kV/cm; (xxv) 21–22 kV/cm; (xxvi) 22–23 kV/cm; (xxvii) 23–24 kV/cm; (xxviii) 24–25 kV/cm; (xxix) 25–26 kV/cm; (xxx) 26–27 kV/cm; (xxxi) 27–28 kV/cm; (xxxii) 28–29 kV/cm; (xxxiii) 29–30 kV/cm; and (xxxiv) >30 kV/cm.

79. A mass spectrometer as claimed in claim 64, wherein, in use, when said ion mirror is at said first setting said ion mirror is maintained at a first voltage and when said ion mirror is at said second setting said ion mirror is maintained at a second voltage.

80. A mass spectrometer as claimed in claim 79, wherein, in use, said first voltage is substantially the same as said second voltage.

81. A mass spectrometer as claimed in claim 79, wherein, in use, said first voltage is substantially different to said second voltage.

82. A mass spectrometer as claimed in claim 81, wherein, in use, the difference between said first voltage and said second voltage is r % of said first or second voltage, wherein r falls within a range selected from the group consisting of: (i) <1; (ii) 1–2; (iii) 2–3; (iv) 3–4; (v) 4–5; (vi) 5–6; (vii) 6–7; (viii) 7–8; (ix) 8–9; (x) 9–10; (xi) 10–15; (xii) 15–20; (xiii) 20–25; (xiv) 25–30; (xv) 30–35; (xvi) 35–40; (xvii) 40–45; (xviii) 45–50; and (xix) >50.

83. A mass spectrometer as claimed in claim 81, wherein, in use, the difference between said first voltage and said second voltage is selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

84. A mass spectrometer as claimed in claim 81, wherein, in use, said first voltage and/or said second voltage fall within a range selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

85. A mass spectrometer as claimed in claim 64, further comprising an ion source, wherein, in use, when said ion mirror is at said first setting said ion mirror is maintained at a first potential relative to the potential of said ion source and when said ion mirror is at said second setting said ion mirror is maintained at a second potential relative to the potential of said ion source.

86. A mass spectrometer as claimed in claim 85, wherein, in use, said first potential is substantially the same as said second potential.

87. A mass spectrometer as claimed in claim 85, wherein, in use, said first potential is substantially different from said second potential.

88. A mass spectrometer as claimed in claim 87, wherein, in use, the difference between said first potential and said second potential is s % of said first or second potential, wherein s falls within a range selected from the group consisting of: (i) <1; (ii) 1–2; (iii) 2–3; (iv) 3–4; (v) 4–5; (vi) 5–6; (vii) 6–7; (viii) 7–8; (ix) 8–9; (x) 9–10; (xi) 10–15; (xii) 15–20; (xiii) 20–25; (xiv) 25–30; (xv) 30–35; (xvi) 35–40; (xvii) 40–45; (xviii) 45–50; and (xix) >50.

89. A mass spectrometer as claimed in claim 87, wherein, in use, the potential difference between said first potential and the potential of said ion source and/or said second potential and the potential of said ion source falls within a range selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

90. A mass spectrometer as claimed in claim 87, wherein, in use, said first potential and/or said second potential fall within a range selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

91. A mass spectrometer as claimed in claim 64, further comprising an ion source selected from the group consisting of: (i) an Electrospray ("ESI") ion source; (ii) an Atmospheric Pressure Chemical Ionisation ("APCI") ion source; (iii) an Atmospheric Pressure Photo Ionisation ("APPI") ion source; (iv) a Laser Desorption Ionisation ("LDI") ion source; (v) an Inductively Coupled Plasma ("ICP") ion source; (vi) an Electron Impact ("EI") ion source; (vii) a Chemical Ionisation ("CI") ion source; (viii) a Field Ionisation ("FI") ion source; (ix) a Fast Atom Bombardment ("FAB") ion source; (x) a Liquid Secondary Ion Mass Spectrometry ("LSIMS") ion source; (xi) an Atmospheric Pressure Ionisation ("API") ion source; (xii) a Field Desorption ("FD") ion source; (xiii) a Matrix Assisted Laser Desorption Ionisation ("MALDI") ion source; and (xiv) a Desorption/Ionisation on Silicon ("DIOS") ion source.

92. A mass spectrometer as claimed in claim 64, further comprising a continuous ion source.

93. A mass spectrometer as claimed in claim 64, further comprising a pulsed ion source.

94. A mass spectrometer as claimed in claim 64, further comprising a drift or flight region upstream of said ion mirror, wherein, in use, when said ion mirror is at said first setting said ion mirror is maintained at a first potential relative to the potential of said drift or flight region and when said ion mirror is at said second setting said ion mirror is maintained at a second potential relative to the potential of said drift or flight region.

95. A mass spectrometer as claimed in claim 94, wherein, in use, said first potential is substantially the same as said second potential.

96. A mass spectrometer as claimed in claim 94, wherein, in use, said first potential is substantially different to said second potential.

97. A mass spectrometer as claimed in claim 96, wherein, in use, the difference between said first potential and said second potential is t % of said first or second potential, wherein t falls within a range selected from the group consisting of: (i) <1; (ii) 1–2; (iii) 2–3; (iv) 3–4; (v) 4–5; (vi) 5–6; (vii) 6–7; (viii) 7–8; (ix) 8–9; (x) 9–10; (xi) 10–15; (xii) 15–20; (xiii) 20–25; (xiv) 25–30; (xv) 30–35; (xvi) 35–40; (xvii) 40–45; (xviii) 45–50; and (xix) >50.

98. A mass spectrometer as claimed in claim 96, wherein, in use, the difference between said first potential and said second potential fall within a range selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

99. A mass spectrometer as claimed in claim 96, wherein, in use, said first potential and/or said second potential fall within a range selected from the group consisting of: (i) <10 V; (ii) 10–50 V; (iii) 50–100 V; (iv) 100–150 V; (v) 150–200 V; (vi) 200–250 V; (vii) 250–300 V; (viii) 300–350 V; (ix) 350–400 V; (x) 400–450 V; (xi) 450–500 V; (xii) 500–550 V; (xiii) 550–600 V; (xiv) 600–650 V; (xv) 650–700 V; (xvi) 700–750 V; (xvii) 750–800 V; (xviii) 800–850 V; (xix) 850–900V; (xx) 900–950; (xxi) 950–1000 V; (xxii) 1–2 kV; (xxiii) 2–3 kV; (xxiv) 3–4 kV; (xxv) 4–5 kV; (xxvi) 5–6 kV; (xxvii) 6–7 kV; (xxviii) 7–8 kV; (xxix) 8–9 kV; (xxx) 9–10 kV; (xxxi) 10–11 kV; (xxxii) 11–12 kV; (xxxiii) 12–13 kV; (xxxiv) 13–14 kV; (xxxv) 14–15 kV; (xxxvi) 15–16 kV; (xxxvii) 16–17 kV; (xxxviii) 17–18 kV; (xxxix) 18–19 kV; (xxxx) 19–20 kV; (xxxxi) 20–21 kV; (xxxxii) 21–22 kV; (xxxxiii) 22–23 kV; (xxxxiv) 23–24 kV; (xxxxv) 24–25 kV; (xxxxvi) 25–26 kV; (xxxxvii) 26–27 kV; (xxxxviii) 27–28 kV; (xxxxix) 28–29 kV; (l) 29–30 kV; and (li) >30 kV.

100. A mass spectrometer as claimed in claim 64, wherein, in use, when said ion mirror is at said first setting ions having a certain mass to charge ratio and/or a certain energy penetrate at least a first distance into said ion mirror and when said ion mirror is at said second setting ions having said certain mass to charge ratio and/or said certain energy penetrate at least a second different distance into said ion mirror.

101. A mass spectrometer as claimed in claim 100, wherein, in use, the difference between said first and second distance is u % of said first or second distance, wherein u falls within a range selected from the group consisting of: (i) <1; (ii) 1–2; (iii) 2–3; (iv) 3–4; (v) 4–5; (vi) 5–6; (vii) 6–7; (viii) 7–8; (ix) 8–9; (x) 9–10; (xi) 10–15; (xii) 15–20; (xiii) 20–25; (xiv) 25–30; (xv) 30–35; (xvi) 35–40; (xvii) 40–45; (xviii) 45–50; and (xix) >50.

102. A method of mass spectrometry comprising:

providing a Matrix Assisted Laser Desorption Ionisation ("MALDI") ion source; and providing a Time of Flight mass analyser comprising an ion mirror;

maintaining said ion mirror at a first setting;

obtaining first time of flight or mass spectral data when said ion mirror is at said first setting;

maintaining said ion mirror at a second different setting;

obtaining second time of flight or mass spectral data when said ion mirror is at said second setting;

determining a first time of flight of first fragment ions having a certain mass or mass to charge ration when said ion mirror is at said first setting;

determining a second different time of flight of first fragment ions having said same certain mass or mass to charge ration when said ion mirror is at said second setting; and determining from said first and second times of flight either the mass or mass to charge ration of parent ions which fragmented to produce said first fragment ions and/or the mass or mass to charge ration of said first fragment ions.

* * * * *